United States Patent [19]

Linder et al.

[11] Patent Number: 4,690,766
[45] Date of Patent: Sep. 1, 1987

[54] CHEMICALLY MODIFIED SEMIPERMEABLE POLYSULFONE MEMBRANES AND THEIR USE IN REVERSE OSMOSIS AND ULTRAFILTRATION

[75] Inventors: Charles Linder, Rehovot; Gershon Aviv, Tel Aviv; Mordechai Perry, Petach Tikvah; Reuven Kotraro, Rehovot, all of Israel

[73] Assignee: Aligena AG, Basel, Switzerland

[21] Appl. No.: 757,911

[22] Filed: Jul. 22, 1985

Related U.S. Application Data

[63] Continuation of Ser. No. 355,509, Mar. 8, 1982, abandoned.

[30] Foreign Application Priority Data

Mar. 17, 1981 [CH] Switzerland .................. 1809/81

[51] Int. Cl.⁴ .................. B01D 13/00; B01D 13/04
[52] U.S. Cl. .................. 210/654; 210/500.28; 210/500.29; 210/500.33; 210/500.37; 210/500.38; 210/500.39; 210/500.41; 210/500.42
[58] Field of Search .................. 210/490, 506, 500.28, 210/500.33, 500.34, 500.36, 500.37, 500.38, 500.39, 500.41, 652, 653, 654, 500.29, 500.42; 55/158; 428/305.5, 419, 315.5, 315.7, 315.9

[56] References Cited

U.S. PATENT DOCUMENTS

3,886,066  5/1975  Chen et al. .
3,984,399 10/1976  Weber et al. .................. 260/240 CA
4,029,582  6/1977  Ishii et al. .
4,260,652  4/1981  Taketani et al. .................. 210/500.2
4,286,015  8/1981  Yoshida et al. .................. 210/500.2

FOREIGN PATENT DOCUMENTS

0008945  3/1980  European Pat. Off. .

Primary Examiner—David Sadowski
Attorney, Agent, or Firm—Wenderoth, Lind & Ponack

[57] ABSTRACT

Semipermeable membranes of modified polysulfones are provided which comprises repeating units of the formula

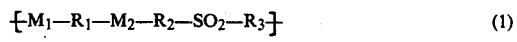

wherein $M_1$ and $M_2$ are independently a valence bond, —O— or —NH—, $R_1$ is a valence bond or a group of the formula

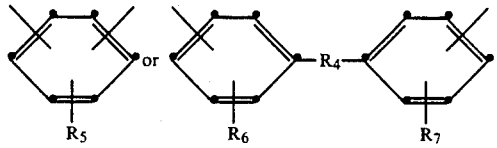

with the proviso that if $R_1$ is a valence bond, only one of $M_1$ and $M_2$ can be —O—, $R_2$ and $R_3$ are independently a group of the formula

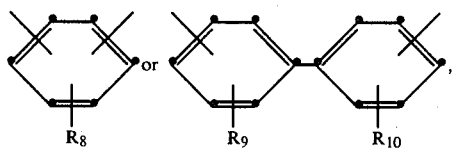

the aryl radicals $R_1$, $R_2$ and $R_3$ are optionally further substituted, $R_4$ is a valence bond, —O—, alkylene of 1 to 4 carbon atoms optionally substituted or interrupted by cycloalkyl(ene) or aryl(ene) of at most 7 carbon atoms, or alkylidene of 2 to 4 carbon atoms, $R_5$ to $R_{10}$ are independently hydrogen, or —$R_{11}NH_2$,

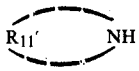

or —$R_{13}OH$ radicals, these radicals being modified through chemical reaction with
 (a) a monomeric compound containing at least two functional groups,
 (b) a polyfunctional, linear or branched oligomer or polymer, and
 (c) a non-ionic or ionic compound containing at least one, preferably two groups capable of reaction with (b),
—$R_{12}X$ or —$R_{13}CHO$ radicals, modified through chemical reaction with (b) and (c), or —$R_{13}CN$ radicals, modified through chemical reaction with hydroxylamine, (a), (b) and (c), $R_{11}$ is a valence bond, —$CH_2$—, alkylene or arylene containing oxygen or nitrogen atoms, $R_{11}'$ constitutes the atoms necessary to form a heterocyclic ring condensed with the polymer backbone and X is halogen, the degree of substitution of substituents $R_5$ to $R_{10}$—different from hydrogen—being between 0.3 and 3 milliequivalents/g.

The new membranes are suitable in reverse osmosis and ultrafiltration processes. They show good permeability (flux) and rejection characteristics combined with solvent and compaction resistance.

26 Claims, No Drawings

CHEMICALLY MODIFIED SEMIPERMEABLE POLYSULFONE MEMBRANES AND THEIR USE IN REVERSE OSMOSIS AND ULTRAFILTRATION

This application is a continuation of now abandoned application Ser. No. 355,509, filed Mar. 8, 1982 now abandoned.

The present invention relates to improved semipermeable membranes useful in diffusion processes such as reverse osmosis (RO) or ultrafiltration (UF). Specifically the invention provides membranes made from chemically modified polysulfones showing improved solvent and compaction resistance as well as good permeability (flux) and rejection characteristics.

The inventive membranes are in general composed of a thin crosslinked hydrophilic film, chemically bonded to a thicker, more porous, crosslinked membrane. Though all the components of the membrane (the thin film and thicker membrane) comprise the invention, the layer may be thought of as improving the rejection of the support membrane to solutes and increasing the efficiency of separating low molecular weight monovalent salts from multivalent or higher molecular weight solutes. In as far as the membrane components are each crosslinked, and also bound to each other, the membrane exhibits solvent and compaction resistance, and resistance to separation of the individual layers.

Thin film composites have been described for RO membranes. In effect microporous or ultrafiltration (UF) supports are coated with hydrophilic materials and crosslinked with hydrophobic crosslinking agents adsorbed (U.S. Pat. No. 4,125,462), or coated and crosslinked with hydrophobic crosslinking agents for salt rejecting (RO) membranes (EP Application No. 0 008 945, U.S. Pat. No. 3,951,815, GB-PS Pat. No. 1,558,807, GB Patent Application No. 2,027,614 A, U.S. Pat. No. 4,039,440). A cardinal principle of this approach is that during fabrication both the crosslinking agent and its solvent are water insoluble and do not dissolve the thin layer. The said layer may vary in thickness between 1000 to 10000 Å, but is preferably between 2000 to 8000 Å. The attachment of the thin layer to the support relies on physical or mechanical attachment (such as partial penetration into the pores of the substrate). Thus, peeling or detachment is possible and is known to occur. In addition, the support systems are generally made of polymers (polysulfones, polyvinylidene fluorides, and polycarbonates) which are solvent sensitive and may dissolve in non-aqueous solvents.

The inventive membranes overcome the shortcomings of such RO composites, such as detachment of layers and further solvent sensitivity are minimized. In addition the coated layer is generally thinner than that disclosed for RO membranes (preferably from monomolecular to 1000 Å rather than 1000 to 5000 Å), and the final crosslinking step is carried out in a hydrophilic solvent (e.g. water aqueous suspensions, aqueous solutions such as water/acetone; dioxane, dimethylformamide) with water soluble multifunctional reagents. The final membrane is useful in ultrafiltration and reverse osmosis and especially for applications in the range of pressures (5 to 50 bar) and cut offs (200 to 2000 MW) associated with membranes between RO and UF.

The membranes according to the present invention are polysulfones modified by a sequence of different chemical reaction steps said membranes are generally bound onto a porous support.

Therefore it is one object of the present invention to provide new semipermeable membranes of modified polysulfones which comprise repeating units of the formula

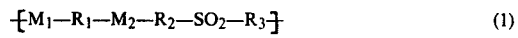

$$\{M_1-R_1-M_2-R_2-SO_2-R_3\} \tag{1}$$

wherein $M_1$ and $M_2$ are independently a valence bond, —O— or —NH—, $R_1$ is a valence bond or a group of the formula

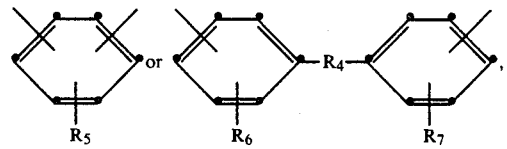

with the proviso that if $R_1$ is a valence bond, ($M_1$ and $M_2$ have the indicated meanings but) only one of $M_1$ and $M_2$ can be —O—, $R_2$ and $R_3$ are independently a group of the formula

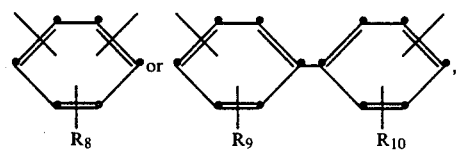

the aryl radicals $R_1$, $R_2$ and $R_3$ are optionally further substituted by alkyl of 1 to 4 carbon atoms, $R_4$ is a valence bond, —O—, alkylene of 1 to 4 carbon atoms optionally substituted or interrupted by cycloalkyl(ene) or aryl(ene) of at most 7 carbon atoms, or alkylidene of 2 to 4 carbon atoms, $R_5$ to $R_{10}$ are independently hydrogen, or —$R_{11}NH_2$,

or —$R_{13}OH$ radicals, these radicals being modified through chemical reaction with
(a) a monomeric compound containing at least two functional groups,
(b) a polyfunctional, linear or branched oligomer or polymer, and
(c) a non-ionic or ionic compound containing at least one, preferably two groups capable of reaction with (b), —$R_{12}X$ or —$R_{13}CHO$ radicals, modified through chemical reaction with (b) and (c), or —$R_{13}CN$ radicals, modified through chemical reaction with hydroxylamine, (a), (b) and (c), $R_{11}$ is a valence bond, —$CH_2$—, $\{CH_2\}_pNH(CH_2)_{\overline{2-6}}$, —$(CH_2)_p$—$O(CH_2)_{\overline{2-6}}$,

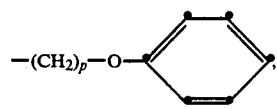

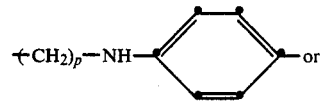

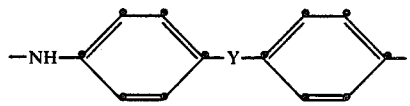

$R_{11}'$ constitutes the atoms necessary to form a heterocyclic ring condensed with the polymer backbone, $R_{12}$ is $-C_nH_{2n}-$, $R_{13}$ is a valence bond or $-C_mH_{2m}-$, Y is $-O-$, $-SO_2-$ or

X is halogen, m is an integer of 1 to 5 and n is an integer of 1 to 6, p is zero or 1, the degree of substitution of substituents $R_5$ to $R_{10}$—different from hydrogen—being between 0.3 and 3.5 milliequivalents/g.

The present invention may be used to modify ultrafiltration or microporous membranes, with average pore sizes varying from 10 to 5000 Å. The preferred range, however, is 10 to 1000 Å and mostly preferred 20 to 200 Å for the achhievement of optimum rejection with flux. The average pore size of the inventive (modified) membranes varies from about 1 to 200 Å, preferably 5 to 60 Å and mostly preferred 10 to 30 Å. Aromatic polysulfones are suited for the disclosed invention because they are characterized by chemical (particularly oxidative) and temperature stability have good membrane forming properties and reactive groups may be easily introduced.

Another object of the present invention is said modified polysulfone membrane bound as film onto a porous support.

Other objects of the present invention are processes for the manufacture of the modified membranes and the composites (superficial films of the modified polysulfones on porous supports), as well as the use of these membranes in fields involving concentration and purification of liquids, e.g. separating salts from organic compounds or purifying waste waters. The inventive membranes being crosslinked may also be used with a higher percentage of organic solutes than would be allowed for uncrosslinked membranes.

These and other objects of the present invention will be apparent from the following detailed description.

$M_1$ and $M_2$ in formula (1) are independently a direct chemical (covalent) bond preferably a single bond, further $-O-$ or $-NH-$. The grouping $-M_1-R_1-M_2-$ can comprise—if $R_2$ is the direct chemical bond (no arylene bridge)—e.g. the groupings $-NH-NH-$ or $-O-NH-$, while the grouping $-O-O-$ should be excluded.

Is $R_4$ alkylene of 1 to 4 carbon atoms it comprises e.g. $-CH_2-$, $-CH_2CH_2-$, $-(CH_2)_4-$ and preferably

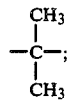

these bridging members can be substituted or interrupted by cycloalkyl(ene), preferably cyclopentyl(ene) or cyclohexyl(ene), or aryl(ene), especially phenyl(ene) or benzyl(ene).

Is $R_4$ alkylidene, special species are $-CH=CH-$ or $-CH_2-CH=CH-CH_2-$.

Preferred meanings of $R_4$ are the direct bond, $-O-$ or

As preferred alkyl($C_1$-$C_4$) substituted to the arylene groupings $R_1$, $R_2$ and $R_3$ methyl can be mentioned.

$R_{11}'$ preferably constitutes the atoms necessary to form a 5- or 6-membered heterocyclic ring condensed with the polymer backbone and containing as further heteroatoms oxygen or preferably nitrogen atoms; of special interest is the imidazolone ring.

X as halogen is Cl, Br or J, wherein Cl is preferred.

Of special interest are now membranes of modified polysulfones which comprises repeating units of the formulae

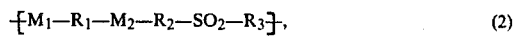 (2)

 or (3)

 (4)

wherein $M_1$ and $M_2$ are $-O-$ or $-NH-$ and $R_1$, $R_2$ and $R_3$ have the indicated meanings.

Preferred are those membranes with repeating units of formula (2) which comprise repeating units of the formula

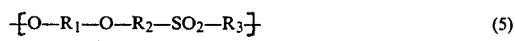 (5)

wherein

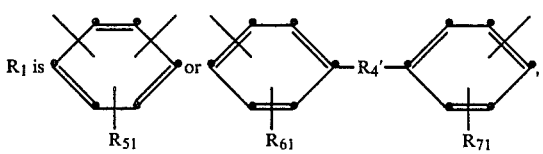

$R_2$ and $R_3$ are independently

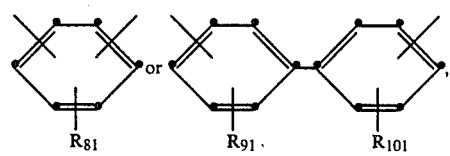

$R_4'$ is a valence bond or alkylene of 1 to 4 carbon atoms, $R_{51}$ to $R_{101}$ are independently hydrogen or
— $CH_2NH_2$, $-CH_2OH$ or $-NH_2$ radicals, modified through chemical reaction with (a), (b) and (c),
— $CH_2X$ radicals, wherein X is halogen, modified through chemical reaction with (b) and (c), or
— $CH_2CN$ radicals, modified through chemical reaction with hydroxylamine, (a), (b) and (c), the degree of substitution of substituents $R_{51}$ to $R_{101}$—different from hydrogen—being between 0.3 and 3.5 milliequivalents/g.

Preferred are those membranes of modified polysulfones with repeating units of the formula

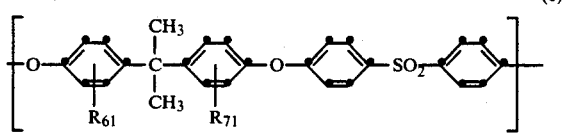
(6)

wherein $R_{61}$ and $R_{71}$ have the meaning indicated above and their degree of substitution—different from hydrogen—being 0.5 to 3.5 milliequivalents/g (meq/g).

Preferred membranes of modified polysulfones with repeating units of formula (6) are those wherein $R_{61}$ and $R_{71}$ is chloromethyl, the degree of substitution being 0.9 to 2.6 and the chloromethyl group is modified through (b) and (c); (b) being a polyethylene imine, polyvinylamine or a condensation product of dicyandiamide, ammonium chloride and formaldehyde; (c) being a reactive dye containing at least two reactive halogen atoms based on triazinyl or pyrimidyl radicals or a non-coloured derivative which is a triazine or pyrimidine substituted by two reactive halogens.

Different unmodified polysulfones are available commercially or via synthetic procedures described in the literature. Such polymers fall within the scope of this invention if they are film formers and if they contain reactive functional groups or the potential for introducing such groups. Commercial available polysulfones suitable for this invention are given below. Their molecular weights (number average) vary between 5000 to 60,000, though the preferred range for membrane formation is between 20,000 to 40,000.

These polysulfones show e.g. the following repeating units:

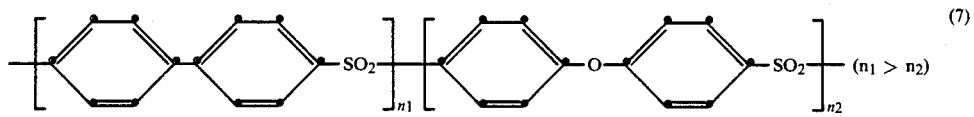
(7)

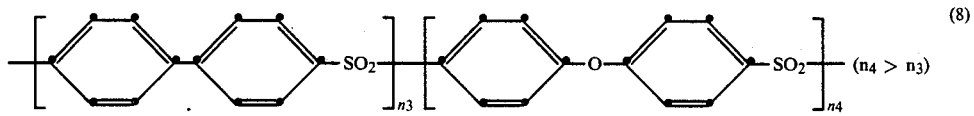
(8)

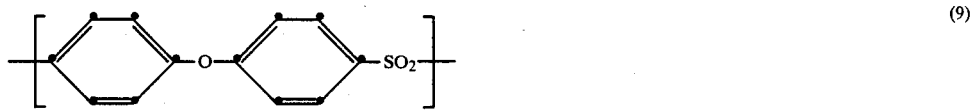
(9)

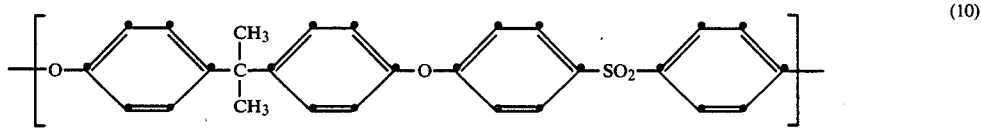
(10)

Other useful polymers are those with the following repeating units:

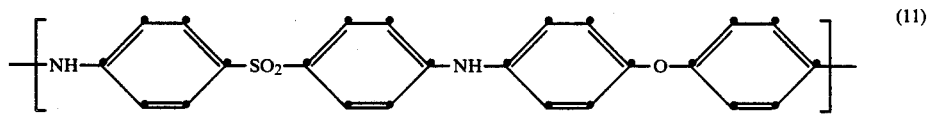
(11)

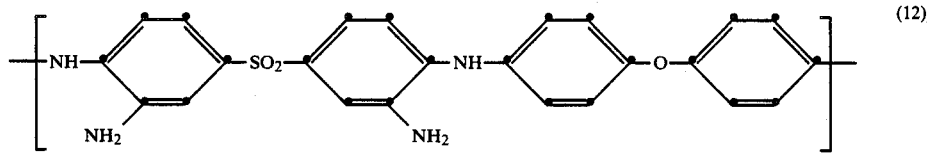
(12)

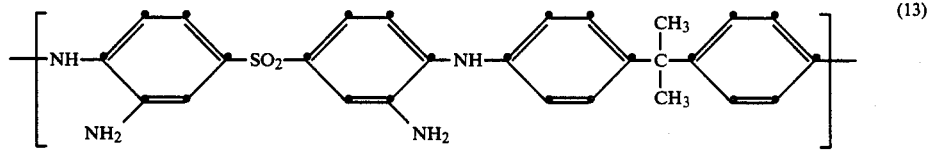
(13)

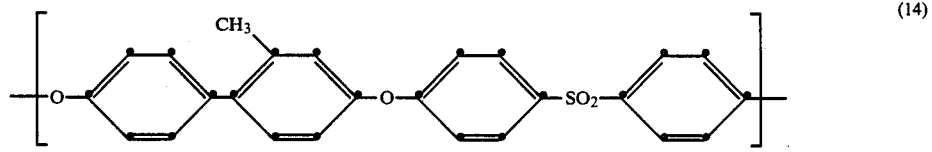
(14)

-continued

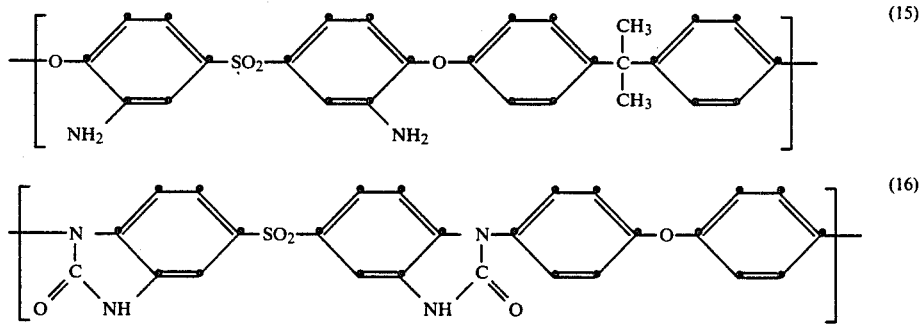

The aromatic groups of polysulfone allow for the introduction of different reactive functions. The formation of reactive derivatives may be carried out on the monomer unit prior to polymerization, on the polymer prior to dissolving in the casting solvent or in the casting solution itself, or on the final membrane, or via a combination of any of these said procedures. The reactive groups may be further converted to other groups, e.g. —$CH_2Cl \rightarrow$—$CH_2NH_2$, which are finally reacted with the coating polymer. In some instances, it is preferably to convert only the groups on the membranes' surfaces or pores leaving the bulk of the membrane with the original groups.

With respect to the foregoing there are however two main methods for manufacturing the inventive membranes: either one casts a so-called unmodified polysulfone onto a support to form a membrane which is then chemically modified or in an alternative route a polysulfone containing "reactive groups" is used in the casting solution to prepare the membrane which is then modified further.

Therefore one process for the manufacture comprises casting a solution of a polysulfone with repeating units of the formula $$\{M_1-R_1'-M_2-R_2'-SO_2-R_3'\}$$ (17)

wherein $M_1$ and $M_2$ are independently a valence bond, —O— or —NH—, $R_1'$ is a valence bond, a group of the formula

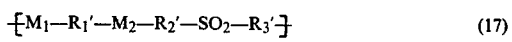

with the proviso that—if $R_1'$ is a valence bond—only one of $M_1$ and $M_2$ can be —O—, $R_2'$ and $R_3'$ are independently

the aryl radicals $R_1'$, $R_2'$ and $R_3'$ are optionally substituted by alkyl of 1 to 4 carbon atoms, $R_4$ is a valence bond, —O—, alkylene of 1 to 4 carbon atoms, optionally substituted or interrupted by cycloalkyl(ene) or aryl(ene) of at most 7 carbon atoms, or alkylidene of 2 to 4 carbon atoms, on a porous support from a casting solution containing a polar organic solvent or solvent mixture and optionally partial solvents, non-solvents, electrolytes and/or surfactants into a membrane and contacting the (non-gelled) membrane with a liquid which is miscible with the polar solvent but is a non-solvent for the membrane to effect coagulation, and then introducing (A) —$R_{11}NH_2$ or —$R_{13}OH$ radicals into the membrane, which are further modified through chemical reaction with
  (a) a monomeric compound containing at least two functional groups
  (b) a polyfunctional, linear or branched oligomer or polymer, and
  (c) a non-ionic or ionic-compound containing at least one, preferably two, group(s) capable of reaction with (b), (B) —$R_{12}X$ or —$R_{13}CHO$ radicals, which are then modified through chemical reaction with components (b) and (c), or (C) —$R_{13}CN$ radicals, which are then modified through chemical reaction with hydroxylamine and further components (a), (b) and (c), wherein $R_{11}$, $R_{12}$, $R_{13}$ and X have the indicated meanings; while the other main route comprises casting a solution of a polysulfone with repeating units of the formula $$\{M_1-R_1''-M_2-R_2''-SO_2-R_3''\}$$ (18)

wherein $M_1$ and $M_2$ are independently a valence bond, —O— or —NH—, $R_1'$ is a valence bond, a group of the formula

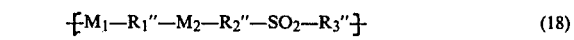

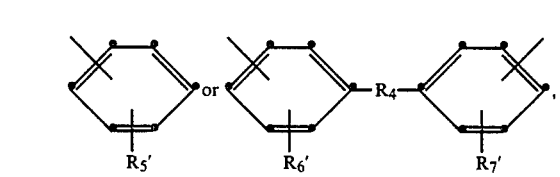

with the proviso that—if $R_1''$ is a valence bond—only one of $M_1$ and $M_2$ can be —O—, $R_2''$ and $R_3''$ are independently

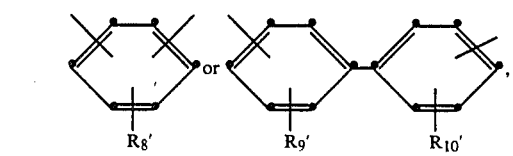

the aryl radicals $R_1''$, $R_2''$ and $R_3''$ are optionally further substituted by alkyl of 1 to 4 carbon atoms, $R_4$ is a valence bond, —O—, alkylene of 1 to 4 carbon atoms, optionally substituted or interrupted by cycloalkyl(ene) or aryl(ene) of at most 7 carbon atoms, or alkylidene of 2 to 4 carbon atoms, $R_5'$ to $R_{10}'$ are independently hydrogen, (A) —$R_{11}NH_2$,

or —$R_{13}OH$ radicals (B) —$R_{12}X$ or —$R_{12}X$ or —$R_{13}CHO$ radicals, or (C) —$R_{13}CN$ radicals, wherein $R_{11}$, $R_{11}'$, $R_{12}$, $R_{13}$ and X have the meanings indicated above, the degree of substitution of substitutents $R_5'$ to $R_{10}'$—different from hydrogen—being between 0.3 and 6 milliequivalents/g, on a porous support from a casting solution containing a polar organic solvent or solvent mixture and optionally partial solvents, non-solvents, electrolytes and/or surfactants into a membrane and contacting the (non-gelled) membrane with a liquid which is miscible with the polar solvent but is a non-solvent for the membrane to effect coagulation, and then modifying the membrane by reacting it with (a) a monomeric compound containing at least two functional groups, (b) a polyfunctional, linear or branched oligomer or polymer, and (c) a non-ionic or ionic compound containing at least one, preferably two group(s) capable of reaction with (b), when $R_5'$ to $R_{10}'$ have the meanings of (A), with (b) and (c), when $R_5'$ to $R_{10}'$ have the meanings of (B), and with hydroxylamine (a), (b) and (c), when $R_5'$ to $R_{10}'$ have the meanings of (C).

The introduction of the reactive radicals into the polysulfone backbone before and after casting as a membrane can be carried out according to known chemical methods.

Most preferred is the halomethylation e.g. with chloromethyl methylether or by using formaldehyde or paraformaldehyde and hydrochloric gas and/or acid in the presence of a metal catalyst such as zinc chloride (U.S. Pat. No. 3,984,399, Example 2). The chloromethyl (—$CH_2$—Cl) group can be easily reacted with ammonia, amines, aminoalcohols, diamines, alkalihydroxides or cyanides to get reactive radicals for further modification which are or which contain as terminal groups amino, hydroxyl, nitrilo or formyl radicals.

Besides the halomethylation it is also possible to incorporate haloalkyls by using corresponding haloalkylating agents. These radicals can then be subjected to chemical reactions with (a), (b) and (c) or other combinations of these reactants as mentioned hereinbefore.

Another procedure for introducing reactive groups is to start with an alkyl group with e.g. 1 to 6 carbon atoms, preferably —$CH_3$, attached on $R_1$, $R_2$ or $R_3$—when they are aryl radicals—which are then brominated or chlorinated via a free radical mechanism (N-bromosuccinimide, benzoyl peroxide) to form halogenalkyls, preferably bromo- or chloroalkyls which again constitute a suitable basis to prepare the other reactive groups mentioned above.

Another method of introducing reactive amino functions is the direct amido-methylation described in Tetrahedron Letters 42, 3795-3798, by A. R. Mitchell.

Still another procedure comprises the nitration of the polymer or the membrane (by $HNO_3/H_2SO_4$ solutions) followed by reduction with e.g. sodium dithionite to get —$NH_2$ groups, which can than be modified by following the reaction sequence (a), (b) and (c).

An important aspect of this invention is the presence of reactive groups, such as amino (primary, secondary amino groups), hydroxyl, cyano, thiocyano, aldehyde, oxirane or vinyl groups or halogen atoms (F, Cl, Br, J) on the starting membrane which can be chemically modified. These reactive groups may be located as substituents on the polymer, or within the backbone itself. The reactive groups may be incorporated into the polymer by the polymerization of monomers already containing the said groups, or may be derived by chemical reactions on the formed polymer. As an example of the latter, halomethyl groups may be readily formed on polysulfone (U.S. Pat. No. 4,029,582), to give:

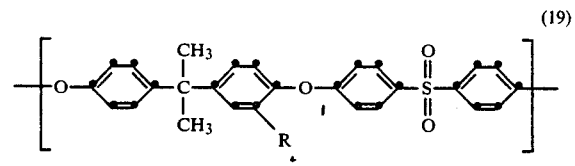

(19)

$R = -CH_2X$ (X=F, Cl, Br, I, preferably Cl or Br).

The halomethyl group may be further converted by well known procedures to:

—$CH_2NH_2$, —$CH_2NH(CH_2)_{2-6}NH_2$, —$CH_2O(CH_2)_{2-6}NH_2$,

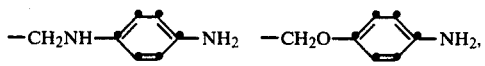

—$CH_2CN$, —CHO, —$CH_2OH$ or to —$CH_2OR_aX_a$, wherein $R_a$ is alkylene ($C_2$-$C_6$) or arylene(phenylene) and $X_2$ is —CN, —CHO or OH.

An example of the polymerization of a monomer with reactive substituents is 3,3-Dinitro-4,4'-dichlorodiphenyl sulfone which may be condensed with 4,4'-diaminodiphenyl either to give a polymer with repeating units of the formula (Desalination 21, (1977), 183-194)

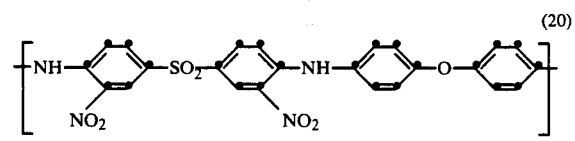

(20)

The nitro groups may be reduced to amino groups and further modified to introduce other functions (especially haloalkyls, cyano, hydroxy).

The range of functional group concentrations in the membranes is a function of the synthetic procedure that introduces the said group, and its effect on membrane formation and properties (e.g. water solubility or brittleness). For example, the —$CH_2Cl$ function may be introduced over the range of 0.3 to 3.5 meq/g, while amino functions above 2.0 meq/g (0.3 to 2 meq/g as preferred range) form weak swellable membranes, and their polymers are difficult to dissolve. An alternative method for introducing a high concentration of amine functions on the membrane's surface and pores, is the formation of a membrane with a high chloromethyl content (2.5 meq/g), and the conversion of the chloro to amine functions on the preformed membrane. If difunctional or multifunctional amines are used then the membrane is also crosslinked.

Cyanomethylated functions introduced by $CN^\ominus$ nucleophilic displacement of $Cl^\ominus$ in $-CH_2Cl$ gives a brittle membrane when the capacity of $CN^\ominus$ is above 1.5 meq/g (suitable range of 0.3 to 1.5 meq/g). If however, the reaction is carried out only on the surface and in the pores of a preformed membrane, the problem of brittleness is decreased. The aldehyde groups can be introduced by treating a chloromethylated polysulfone in dimethylsulfoxide with $NaHCO_3$ at high temperatures (140° C.), extracting the reaction mixture with $CHCl_3$ and reprecipating the polymer in water (J. M. Frechet, C. Schuerch, JACS 93, 492 (1971)).

The concentration of reactive groups may be quite higher (e.g. 0.3 to 6 meq/g) if the polymer is prepared from a monomer containing the reactive group or a precursor (polymers of formulae 12, 13, 15 and 16). Thus, in polymer of formula (12) the $-NH_2$ content is 5.8 meq/g. In the subsequent binding crosslinking reaction not all the functional groups are expected to participate in the reaction. The extent of such reactions should be limited to prevent excessive crosslinking and enbrittlement.

The lower limit of functional groups capacity is determined by the minimum concentration needed to crosslink the polymers and to ensure efficient binding for the subsequent reaction to the hydrophilic polymer. This varies with the particular functional group and the molecular weight of the coating polymer. In general, however, a capacity of 0.3 meq/g was found to be the minimum for modification. It is preferred, however, to have a capacity of at least 1.0 meq/g, for efficient modification (0.3 to 3.5, preferably 1.0 to 2.5 meq/g).

When polysulfones with HO-final groups (cf. formulae 10, 14, 15) are used even a lower capacity of functional HO-groups of 0.05 (0.05 to 3.5, preferably 0.1 to 2.5 meq/g) can be sufficient for modification (of special interest when low molecular polysulfones of said formulae are used).

Membrane casting may be performed by any number of casting procedures cited in the literature (i.e. U.S. Pat. No. 4,029,582, GB Patent Application No. 2,000,720, U.S. Pat. Nos. 3,556,305, 3,615,024, 3,567,810). Thus, the polymer or its derivative, may be dissolved in a suitable solvent or mixture of solvents (for example, N-methylpyrrolidone (NMP), dimethyl sulfoxide (DMSO), dimethyl formamide (DMF), hexamethylphosporamide, N,N-dimethylacetamide, dioxane), which may or may not contain cosolvents, partial solvents, non-solvents, salts, surfactants, or electrolytes, for altering or modifying the membranes morphology and its flux and rejection properties (i.e. acetone, ethanol, methanol, formamide, water, methylethyl ketone, triethyl phosphate, $H_2SO_4$, HCl, Tweens, Spans, sodium dodecyl sulfate (SDS), sodium dodecylbenzene sulfonate, sodium hydroxide, potassium hydroxide, potassium chloride, zinc chloride, calcium chloride, lithium nitrate, lithium chloride, magnesium perchlorate etc.).

The casting solution may be filtered by any of the known processes (i.e. pressure filtration through microporous filters or by centrifugation), and cast on a substrate such as glass, metal, paper, plastic etc., from which it may then be removed. It is preferable, however, to cast on a porous support material from which the membrane is not removed. Such porous supports may be non-woven or woven cloths such as cellulosics, polyethylene, polypropylene, nylon, polyvinyl chloride and its copolymers, polystyrene and polyethylene terephthalate (polyesters), polyvinylidene fluoride, polytetrafluoro ethylene and glass fibers. The membrane may alternatively be formed as a hollow fiber or tublet, not requiring a support for practical use.

The concentration of polymer in the casting solution may vary as a function of its M.W. and additives between 5 to 80%, but preferably between 10 and 50% and most preferred between 15–30%. The temperature of casting may vary from $-20°$ to $100°$ C. but the preferred range is between $0°-60°$ C., varying as a function of the polymer, its molecular weight, and the cosolvents and additives, in the casting solution.

The polymer casting solution may be applied to the above mentioned substrates by any of the well known techniques, known to those practiced in the art. The wet film thickness may vary between $5\mu$ to $2000\mu$.

The preferred range being $50\mu$ to $800\mu$ and the most preferred 100 to $500\mu$. The wet film and support may then be immersed immediately, or after a partial evaporation step (from 5 sec. to 48 hours) at ambient condition or elevated temperature, or vacuum or any combination thereof into a gelling bath of a non solvent. Such baths are usually water, or water with a small percent of a solvent (e.g. DMF, NMP) and/or surfactant (e.g. sodium dodecyl sulfate) at a temperature of $0°$ to $70°$ C. An example of a commonly used gelling bath is water with 0.5% SDS at $4°$ C. In another mode of forming membranes, a polymer solution containing a component that may be leached out in water or another solvent, is cast and dried before immersion. After immersion, leachable material is removed resulting in a porous membrane. In a third variation, a polymer solution without any leachable materials is cast and taken to dryness, resulting in a porous membrane by virtue of this physicochemical properties of polymeric material—solvent combination or by a subsequent chemical reaction that creates pores. All the above methods may be used to form membranes for further modification as described by this invention. This modification process has several variations but is primarily based on the following sequence that binds a polymer layer to the support membrane and crosslinks this support membrane and polymer film.

The reaction steps are the following:

(a) The reaction of a multifunctional reagent with functional groups (amino, hydroxyl) on the membrane which may be present as substituents on a polymer backbone or as an integral part of the same said backbone. In the practice of this invention, not all the groups of the multifunctional reagent will participate in the crosslinking of membranes, and a given fraction is available for binding a hydrophilic oligomer or polymer in step (b). In one preferred embodiment of the invention (when e.g. haloalkyl or aldehyde groups are present as substituents to the polysulfone backbone), the aforementioned hydrophilic oligomer or polymer is the said multifunctional reagent, thus obviating the second step.

(b) Unreacted groups of the multifunctional reagent in step (a) are used to bind a reactive oligomer or polymer to the membrane prepared in step (a). The now bound polymer is a thin film that contains additional unreacted groups for a further reaction with e.g. non-ionics that crosslink the said polymer and/or ionics that additionally introduce charged ionic species in step (c). Functional groups binding to the membranes may or may not be the same as those reacting in the subsequent step.

(c) Ionic (anionic) or hydrophilic (non-ionic) multifunctional reagents are reacted with the functional groups of the bound polymer in step (b) above, thus crosslinking and/or charging the said polymer.

The invention membranes are thus formed by a buildup of a bound hydrophilic oligomer or polymer or polyelectrolyte on the basic membranes' (polysulfone) surface and/or in the pores.

Compounds (a) which can be used as the multifunctional reagents are monomeric, ionic, preferably non-ionic compounds which possess crosslinking properties and can enter into chemical bonding both with the (polysulfone starting) membrane (containing reactive groups) and the coating polymer. These compounds, which have at least two functional groups, possess their reactivity by virtue of reactive multiple bonds, epoxide groups, aziridine groups, aldehyde groups, imidate groups or isocyanate or isothiocyanate groups, further hydroxyl, anhydride, acyl halide, carbonic acid imide halide or N-methylol groups, (these bonds or groups may be further substituted), or of substituents detachable as tertiary amines or preferably as anions, and combinations of these are also possible. The compounds contain, for example, the groupings

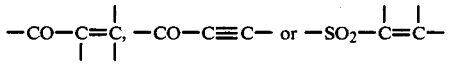

as a multiple bond to which further substituents can be added on. The isocyanate or isothiocyanate group can also be considered as a group of this type. Component (a) can contain quaternary ammonium groups, which are split off as tertiary amines, for example a trimethylammonium or pyridinium group or sulfonium groups, as the leaving groups. However, component (a) preferably contains substituents with groups that split off as an anion, and preferably containing a reactive halogen atom, as the reactive group. These leaving groups posses their reactivity by virtue of, for example, the influence of electrophilic groups, such as the —CO— or —SO$_2$— group in saturated aliphatic radicals. They also possess their reactivity by virtue of the influence of a quaternary nitrogen atom, such as in the group $=\oplus NCH_2CH_2Cl$, or in aromatic radicals by vitrue of the influence of electrophilic groups in the o- and p-position, for example nitro, hydrocarbonsulfonyl or hydrocarboncarbonyl groups, or of the bond to a ring carbon atoms which is adjacent to a tertiary ring nitrogen atom, as in halogenotriazine or halogenopyrimidine radicals.

Compounds which have proved particularly advantageous are cyclic carbonic acid imide-halides and in particular halogeno-diazines or -triazines containing at least two reactive substituents, as well as compounds containing isocyanate or isothiocyanate groups. Tetrachloropyrimidine and in particular cyanuric chloride have proved particularly advantageous.

The cyclic carbon acid imide-halides used here in step (a) are advantageously:

(A) s-Triazines containing at least two identical or different halogen atoms bonded to carbon atoms, for example cyanuric chloride, cyanuric fluoride, cyanuric bromide and also primary condensation products of cynuric fluoride or cyanuric chloride or cyanuric bromide and, for example, water, ammonia, amines, alkanols, alkylmercaptans, phenols or thiophenols; further of phenols, anilines, alkanols and alkylamines containing ionic groups which will render the dihalogenated triazines water-soluble. Such ionic groups are sulfonic, carboxylic, quaternary ammonium, sulfonium or phosphonium groups.

(B) Pyrimidines containing at least two reactive, identical or different halogen atoms, such as 2,4,6-trichloro-, 2,4,6-trifluoro- or 2,4,6-tribromo-pyrimidine, which can be further substituted in the 5-position, for example by an alkyl, alkenyl, phenyl, carboxyl, cyano, nitro, chloromethyl, chlorovinyl, carbalkoxy, carboxymethyl, alkylsulfonyl, carboxamide or sulfonamide group, but preferably by halogen, for example chlorine, bromine or fluorine. Particularly suitable halogenpyrimidines are 2,4,6-trichloro- and 2,4,5,6-tetrachloro-pyrimidines; water-soluble derivatives of pyrimidines similar to those of (A) above.

(C) Halogenopyimidinecarboxylic acid halides, for example dichloropyrimidine-5- or 6-carboxylic acid chloride;

(D) 2,3-Dihalogeno-quinoxaline-, -quinazoline- or -phthalazine-carxylic acid halides or -sulfonic acid halides, such as 2,3-dichloroquinoxaline-6-carboxylic acid chloride or acid bromide;

(E) 2-Halogeno-benzthiazole- or -benzoxazole-carboxylic acid halides or -sulfonic acid halides, such as 2-chloro-benzthiazole- or -benzooxazole-5- or 6-carboxylic acid chloride or -5- or -6-sulfonic acid chloride; and (F) Halogeno-6-pyridazonyl-1-alkanoyl halides or 1-benzoyl halides, for example 4,5-dichloro-6-pyridazonyl-1-propionyl chloride or -1-benzoyl chloride.

Further compounds which contain at least two reactive substituents and can be employed are, for example:

(G) Anhydrides or halides of aliphatic, $\alpha,\beta$-unsaturated mono- or di-carboxylic acids having preferably 3 to 5 carbon atoms, such as maleic anhydride, acryloyl chloride, methacryloyl chloride and propionyl chloride;

(H) Anhydrides or halides of aliphatic mono- or di-carboxylic acids having preferably 3 to 10 carbon atoms, or of aromatic carboxylic acids, containing reactive halogen atoms, for example chloroacetyl chloride, $\beta$-chloropropionyl chloride, $\alpha,\beta$-dibromopropionyl chloride, $\alpha$-chloro- or $\beta$-chloro-acryloyl chloride, chloromaleic anhydride and $\beta$-chloro-crotonyl chloride, and fluoro-nitro- or chloro-nitro-benzoic acid halides or -sulfonic acid halides in which the fluorine atom or the chlorine atom is in the o-position and/or p-position relative to the nitro group;

(I) Carboxylic acid N-methylolamides or reactive functional derivatives of these methylol compounds. Carboxylic acid N-methylolamides are in particular N-methylol-chloroacetamide, N-methylolbromoacetamide, N-methylol-$\alpha,\beta$-dichloro- or -dibromo-propionamide, N-methylol-acrylamide and N-methylol-$\alpha$-chloro- or -$\alpha$-bromo-acrylamide. Reactive derivatives of the carboxylic acid N-methylolamides are for example, the corresponding N-chloromethyl- or N-bromomethyl-amides;

(J) Free or etherified N-methylolureas or N-methylolmelamines, for example N,N-dimethylolurea, N,N-dimethylolurea dimethyl ether, N,N'-dimethylolethylene- or -propylene-urea, 4,5-dihydroxy-N,N'-dimethylolethyleneurea or 4,5-dihydroxy-N,N'-dimethylolethyleneurea dimethyl ether and di- to -hexamethylolmelamine, trimethylolmelamine dimethyl ether, pentamethylolmelamine di- to -trimethyl ether and hexamethylolmelamine pentamethyl or hexamethyl ether;

(K) Condensation products of dialkylalkanes containing at least one phenolic hydroxyl group and halogenhydrins, for example the diepoxide obtained friom 2,2-bis-(4'-hydroxyphenyl)-propane and epichlorohydrin, as well as glycerol triglycidyl ethers and also corresponding diaziridines;

(L) Di-aldehydes, for example glutaraldehyde or adipaldehyde;

(M) Diisocyanoates or diisothiocyanates, such as alkylene ($C_2$–$C_4$) diisocyanate, e.g. ethylene diisocyanate, phenylene- or alkyl-($C_1$–$C_4$)-substituted phenylenediisocyanates, e.g. phenylene-1,4-diisocyanate or toluene-2,4-diisocyanate, or phenylene-diisothiocyanates, for example phenylene-1,4-diisothiocyanate; or (N) Further reactive compounds, such as trisacryloylhexahydro-s-triazine, epoxides or aziridines.

For the reaction of a polysulfone membrane (containing e.g. hydroxyl or amino groups) in step (a) with a multifunctional organic compound it is treated, when e.g. cyanuric chloride is used, with an aqueous (aqueous-organic [acetone]) solution (suspension) of this reagent which (solution) can contain 0.5 to 5 parts of cyanuric chloride per part of membrane. The reaction temperature should be kept below 4° C., for example at 0° C., in order to prevent hydrolysis of the cyanuric chloride; the pH value range is approximately between 8 and 11 and the reaction time can be from 20 minutes to 5 hours.

A polysulfone starting membrane containing cyano groups can be modified by treating for 3 to 60 minutes at temperatures of about 55° to 75° C. with an aqueous solution of hydroxylamine (2 to 15%), which has a pH value of 2 to 11 and preferably of 6 to 7 (for example adjusted with sodium carbonate). The membrane treated in this way is then removed from the reaction solution and placed in an aqueous solution (suspension) of the (multifunctional) organic compound (a) as described before.

Further modification of these membranes (steps (b), (c)) as well as the modification of polysulfone starting membranes containing haloalkyl or aldehyde groups are described in the following chapters.

The sequence of binding the polymer film to the basic membrane (step (b)) is a function of the groups involved. By way of an example however, halomethylated polysulfone will be described. The introduction of halomethyl groups into a polysulfone backbone is readily achieved. In particular chloromethylation of aromatic groups is well documented, (U.S. Pat. No. 4,029,582). The binding of hydrophilic polymers containing amines, or hydroxyl groups can occur via an nucleophilic displacement of the haloatom on the polysulfone membrane. Both binding to and crosslinking of the support occur at this stage. Different catalysts, and solvent combinations may be employed to enhance the reaction. For example a 18% chloromethylated polysulfone (2.0 meq/g) in N-methylpyrrolidone is cast on a support and immersed immediately in ice water. The membrane, after leaching is placed in an aqueous bath of polyethyleneimine (PEI) (M.W. 30,000) containing 1% potassium iodide at 50° C. for 5 minutes. The membrane is found to be crosslinked and contains a bound layer of PEI for further reaction. Membranes containing aldehyde functions can be modified in an analogous way.

Polysulfone membranes with an amino, hydroxy, or amidoxime group (as alkyl and/or aryl substituents or within the backbone) require in most cases an additional reaction with a multifunctional reagent prior to binding with an amine or hydroxy polymer. This multifunctional reagent reacts with the functional group on the membrane, crosslinking the membrane, and then through unreacted groups reacts with the amine or hydroxyl groups of the said hydrophilic polymer.

In another variation of the invention, the functional groups on the membrane may be converted to different groups and then reacted with the coating polymer or to a multifunctional reagent and then to the said polymer. As an example of the latter, is the nitrile function. The nitrile function may be reduced to amines or reacted with hydroxylamine to amidoximes. Both the amine and the amidoxime may be further reacted with a multifunctional reagent and then the polymer. An example of the former sequence are aryl methyl groups. Halo radicals may be introduced into the methyl portion using N-halosuccinimide and a free radical source. The resultant halomethyl may be reacted directly with the coating polymer.

Hydrophilic polymers are used in step (b) to react to and to coat the membrane substrate. The preferred polymers are polyfunctional aliphatic, aromatic or oligomers or polymers heterocyclic which contain amino groups which can be primary, secondary or tertiary. Other alternatively, but less preferred, they may be polymers of hydroxyl or thiofunctions. The aliphatic oligomers or polymers can be acyclic or cyclic ones. Examples of such polymers are polyethyleneimines (M.W. 189–2000,000) which can be partially alkylated or otherwise modified, polyvinylamines (M.W. 1000 to 2,000,000), polyvinyl alcohols (M.W. of 2,000 to 200,000) or partially esterified polyvinyl alcohols, polyvinylanilines, polybenzylamines, polyvinylmercaptans, condensation products of dicyandiamide, amine salts (ammonium chloride) and formaldehyde (U.S. Pat. No. 3,290,310), polymers of 2-hydroxyethyl or 2-amminoethyl-methycrylates, polyvinylimidazolines, amine modified poly-epihalohydrin (described in U.S. Pat. No. 1,558,807), polydiallylamine derivatives and polymers containing piperidine rings (described in GB Pat. No. 2,027,614A), amino polysulphones, amino polyarylene oxides (e.g. amino methylated polyphenylene oxide) and hydrophilic amines containing polymers (described in EP Application No. 0,008,945). The above polymers may be in part a copolymer or a polymer containing other monomeric units, block polymers or graft polymers. If they are copolymers the other monomeric units may or may not contain ionic groups (—$SO_3^\ominus$, —$COO^\ominus$, —$N^\oplus R_3$).

The preferred polymers are poly aliphatic (acyclic or cyclic) amines. Polyethyleneimine is an example of this group. The range of molecular weights may be between 150(189) to 2,000,000, but preferably between 1000 and 200,000 and most preferred 10,000–70,000. Low molecular weight polymers or oligomers (150 to 1000) may be used but the increase in solute rejection of the final membrane is not as great when higher molecular weight polymers are used.

The molecular weight may also influence the degree of crosslinking. For example, PEI of molecular weight of 30.000 will crosslink a membrane of chlormethylated polysulfone (1.6 meq/g) in 3 minutes at room temperature, while PEI of molecular weight of 189 will not crosslink the membrane under the same conditions. The latter one is still soluble in NMP.

Water is the preferred solvent for the aforementioned molecules, though other solvents such as low molecular weight alcohols or ketones may be used alone or in combination with water. The range of polymer concentration may be from 0.1 to 100%, but preferably between 1 and 30% and most preferred between 5 and 15%. The concentration of polymer needed to achieve optimum rejection/flux characteristics is a function of the reactive groups involved, the temperature, time of immersion, and pH. These factors (together with a rinse step after immersion) control the extent of binding and the thickness of the polymer layer deposited on the membrane. The temperature of the polymer solution during membrane immersion may vary from 0° to 90° C. The optimum temperature is a function of the reaction kinetics of the reactants. For example, the reaction of chloromethylated polysulfone with PEI may require a temperature of 30° C. for 5 minutes while the binding reactions between chlorotriazinyl groups and PEI is carried out at 25° C. for 30 minutes.

The time of immersion may vary between 1 second to 48 hours (preferably 30 seconds to 5 minutes) as a function of the temperature, pH, concentration of reactants and molecular weight of PEI. For example, at a pH of 8.5 and temperature of 50° C., a chloromethylated polysulfone membrane (2.0 meq/g) should be immersed between 2 to 12 minutes in 10% PEI (M.W. 30,000) to give high rejection and flux. Longer immersion times may be detrimental to the flux and rejection. An amine containing polymer, after having been reacted with a multifunctional reagent such as cyanuric chloride, need only be immersed in a 10% PEI solution at 20° C. for 5 to 30 minutes to achieve a high rejection.

The pH of the polymer solution may be adjusted to control the solubility of the polymer, the rate of reaction of the polymer to substrate and the quantity of polymer adsorbed to the surface. Thus, for amines, a pH above 7.0 increases nucleophilic reaction rates, and for membrane modifications a pH range of 7.0 to 10.0 was found to be optimum in most cases, though higher or lower pH's could also be used. If more acidic pH's are used to improve the solubility of the coating polymer, a given time is allowed for adsorption of the polymer to the membrane and then the pH is increased above 7.0 for binding. pH's above 12 are not desirable as they may promote hydrolysis of the functional groups on the membrane.

The molecular weight (M.W.) of the PEI can play an important role in the optimization of flux and rejection. If the membrane to be modified has a relatively low rejection (less than 90%) then higher molecular weight PEI (M.W. of about 10,000 to 100,000) are necessary to achieve at least 98% rejection. If, on the other hand, the basic membranes to be modified have greater than 90% rejection, PEI of lower molecular weight (600–9,000) should be used to achieve high rejection (99%) with high flux. Higher molecular weight PEI results in high rejection, but with a corresponding lower flux.

After immersion the coated membrane is rinsed in water to remove excess polymer. The time of rinsing may vary from one minute to 48 hours, but most preferable from 30 minutes to 4 hours. Excessive washing or rinsing results in membranes with lower than maximum rejection but still higher than the unmodified membrane. Shorter rinsing times leave a relatively thick deposit of polymer and result in relatively low fluxes. The pH and temperature of the rinsing solution may vary between 1.0 and 10, and 0° to 70° C. respectively. Shorter rinsing times are required at the higher temperatures and low pH's (1-3).

The rinsing solution may also contain solutes, which facilitate the removal of excess hydrophilic polymer and thus shorten the required time of rinsing. Such solutes may be taken from surfactants (anionics and nonionics; sodium diamyl sulfate, dodecylbenzene sulfonic acid, Tweens, etc.), salts, (e.g. sodium carbonate, sodium bicarbonate, sodium sulfate, magnesium chloride, etc.) and non-reactive (intrinsically or under the conditions of reaction) dye molecules e.g. congo red).

The thin deposited film is crosslinked in step (c) and/or charged with a multifunctional reagent. The function of these reagents is to crosslink the thin layer and if the reagent is ionic, charges are also incorporated (for example, $-SO_3^\ominus$, $-COO^\ominus$, $-NR_4^\oplus$) within the layer. If the thin layer is monomolecular, then the function of crosslinking is not necessary and the primary importance of the reagent is the introduction of charged or ionic groups.

In the preferred embodiment, ionic multifunctional reagents were found to give membranes with relatively high flux concomitant with a high rejection. In another variation, the multifunctional reagents are hydrophilic or partially water soluble. In this case they function simply to crosslink the adsorbed or coated layers.

Unlike the state of the art practiced in the fabrication of composite RO membranes, the crosslinking (and charging step) is preferably carried out in an aqueous solution. Thus, water soluble multifunctional reagents are found to give good results. The preferred reagents in this group are ionic or charged derivatives of triazinyl or pyrimidinyl compounds. Reactive azo dyes (containing sulfonic acid groups, carboxyl groups or ammonium groups) belong to this class as do non-colored compounds with the aforementioned functions. An effective reagent may crosslink via chemical bonds, electrostatic interactions of ionic groups, and by chelation or coordination of polymeric functions with metal ions. The preferred mode of crosslinking is via a covalent bond, though the other two modes may also be used. In some cases all three modes of crosslinking may be operative via application of a single component (e.g. dye of formula (101)), or may be reached by sequential or parallel application of 2 or 3 different compounds (dyestuff and metal salt).

Multivalent metal salts that may find application in crosslinking said film via chelation or coordination bonds are for example $CuSO_4$, $CrCl_3$ and $FeCl_3$. These salts may be applied alone, in combination with each other, or in combination with covalent (ionic) binding compounds.

Included within the scope of this invention are also hydrophilic multifunctional (non-ionic, colorless) reagents such as low molecular weight difunctional epoxides, aziridines, anhydrides, and preferably a cyclic carbonic acid imide halides (cyanuric chloride or tetrachloropyrimidine), dihalides of dicarboxylic acides, dialdehydes or trihalides of tricarboxylic acids. While many of the above reagents can be applied in aqueous solutions within a narrow range of pH and temperature, the acyl halides must be disolved in aprotic solvents.

The reactive dyes, which can belong to various categories, for example anthraquinone, formazan or preferably azo dyes which are optionally metal complexes.

Suitable reactive groups (which are part of the dyes) are the following: carboxylic acid halide groups, sulfonic acid halide groups, radicals of $\alpha,\beta$-unsaturated carboxylic acids or amides, for example of acrylic acid, methacrylic acid, $\alpha$-chloroacrylic acid, $\alpha$-bromoacrylic acid or acrylamide radicals of preferably low halogenoalkylcarboxylic acids, for example of chloroacetic acid, $\alpha,\beta$-dichloropropionic acid or $\alpha,\beta$-dibromopropionic acid; radicals or fluorocyclobutanecarboxylic acids, for example of tri- or tetra-fluorocyclobutanecarboxylic acid; radicals containing vinylacyl groups, for example vinylsulfone groups or carboxyvinyl groups; radicals containing ethylsulfonyl ($-SO_2CH_2CH_2OSO_2OH$, $-SO_2CH_2CH_2Cl$) or ethylamino sulfonyl groups ($-SO_2NHCH_2CH_2OSO_2OH$) and halogenated heterocyclic radicals such as dihaloquinoxalines, dihalopyridazonyl, dihalophthalazines, halobenzothiazoles and preferably halogenated pyrimidines or 1,3,5-triazines such as monohalotriazines, dihalotriazines, 2,4-dihalopyrimidines or 2,4,6-trihalopyrimidines. Suitable halogen atoms are fluorine, bromine and especially chlorine atoms.

Examples of reactive groups present in component (c) are monochlorotriazinyl, dichlorotriazinyl, 2,4-dichloropyrimidinyl, 2,3-dichloroquinoxaline-6-carbonyl, 4,5-dichloro-pyridazonylpropionyl, 1,4-dichlorophthalazine-6-carbonyl, chlorobenzothiazole linked to the dye via $-CONH-$, $-SO_2NH-$, $-NH-Ar-N=N-$ (Ar=phenylene or naphthylene), 5-chloro-4-methyl-2-methylsulfonyl pyrimidinyl, vinylsulfonyl, $\beta$-sulfato ethylsulfonyl, $\beta$-sulfatoethyl aminosulfonyl, $\beta$-chloroethylsulfonyl or $\beta$-sulfatopropionamido.

Mostly preferred components (c) are reactive azo dyestuffs containing sulfonic acid ($-SO_3H$) or carboxyl ($-COOH$) groups (either group may be also present in salt form, such as alkali metal salt (sodium salt) and as reactive groups monochlorotriazinyl, dichlorotriazinyl, 2,4-dichloropyrimidinyl, vinyl sulfonyl, $\beta$-sulfatoethylsulfonyl, $\beta$-chloroethylsulfonyl or $\beta$-sulfatoethylaminosulfonyl radicals.

Ionisable groups which the membrane-modifying substances (c) can contain are, for example, sulfato groups, sulfonic acid groups, carboxylic acid groups, ammonium groups formed from primary, secondary or tertiary amino groups and hydrogen, or quaternary ammonium groups and also phosphonium or sulfonium groups. Particularly advantageous results are achieved with substances containing sulfonic acid groups.

The membranes which contain at least at the membrane surface an oligomer or polymer (introduced according to step (b)) modified by an azo dye containing sulfonic acid groups are particularly valuable and versatile in use. The azo dye can also contain a metal, for example copper, bonded as a complex.

The reaction step (c) serves to optionally introduce positive or negative charges (ionic groupings) into the membrane surface and/or the pores and/or to crosslink the membrane and is effected in one or two stages.

The one-stage process means that the compound carrying the charge and the so-called fixing agent (for example alkali) are used in one bath.

The two-stage process comprises first the step involving the adsorption of the compound carrying the charge and then, in a separate reaction solution, the fixing step (chemical reaction between component (c) and the (modified) membrane). The two-stage process is preferred since, on the one hand, the concentration of component (c) in the adsorption solution can be kept lower and a solution of this type can optionally be used several times and, on the other hand, the total reaction time is shorter than in the case of the one-stage process.

In the two-stage process, the concentration of e.g. a reactive dye (component (c)) in aqueous solution can be about 0.5 to 3%; the adsorption is carried out, for example, at temperatures of 20° to 35° C. over a period of 2 to 60 minutes; the pH value can be 4 to 8. Fixing can then be carried out in an aqueous soluion, the pH of which has been adjusted to 9 to 12, and the reaction time can be about 30 minutes. The pH is adjusted to the desired value using any desired inorganic (sodium carbonate) or organic bases.

Furthermore, it is also possible to introduce the charged groups into the membrane by reacting reagents, such as alkyl halides or benzyl halides, with an amino group of the polymer chain. In this way, for example, the polyethyleneimine radical can be modified by methyl iodide or dimethyl sulfate. On the other hand, the modification can also be effected with chlorosulfonic acid itself.

Depending on the intended application, the membranes can be in various (flat or tubular) forms, for example in the form of sheets, leaves or tubes, or in the form of a pocket, bag, cone or of hollow fibres. When subjected to severe pressure, the membranes can, of course, be protected by non-woven supports, supports made of textile fibres or paper, wire screens or perforated plates and tubes (modules). Within the range indicated further above, the pore size can be varied by means of different temperatures and can likewise be suited to the particular application. Thus, for example, by subjecting the membranes to heat treatment (50° to 140° C.) before or after their chemical modification it is possible to change the pore size and thus the flux and the rejection of the membranes.

Compared with known modified membranes, the inventive membranes show the following advantages:

1. Improved rejection for charged ionic substances, especially ionic substances have a multiple charge, in an aqueous solution.
2. An increase in the difference between the rejection for ions with a multiple charge and the rejection for monovalent ions in aqueous solution.
3. An improvement in the efficiency of concentrating charged ions, especially ions having a multiple charge, from the solvent (water).
4. An improvement in the efficiency when separating dissolved substances with a multiple charge from dissolved substances with a single charge.
5. An improvement in the efficiency of the separation of low-molecular dissolved substances from high-molecular dissolved substances, both the low-molecular and the high-molecular substances being monovalent and having the same charge (positive or negative).
6. Possibility for use at pH values of about 2 to 12 and temperatures of up to 70° C.
7. Improvement in solvent resistance to the extent that the membrane is no longer soluble in the solvents of polysulfone (e.g. N,N-dimethyl-formamide).
8. Improved resistance to high pressure (good stability). Pressures between about 2 and 100 bars, preferably 2 and 50 bars and most preferred between 2 and 30 bars.

The following applications in particular are advantageous for the membranes according to the invention and, in principle, these applications always concern the separation of monovalent ions of low ionic weight from polyvalent ions of low or relatively high ionic weight or from monovalent ions of relatively high ionic weight, or the separation of ionic substances from non-ionic substances or of ionic compounds of different molecular weights or of opposite charge. The separation process (RO- or UF-process) for concentrating and/or purifying liquids or separating components dissolved in these liquids comprises disposing on one side of a semipermeable membrane of the present invention, a solution with a solute and applying a hydraulic pressure against said solution and said membrane, said pressure being greater than the osmotic pressure of said solution.

1. The separation of organic and metal-organic ionic substances from by-products from a reaction mixture and other substance which are contained therein, for example from salts, such as sodium chloride, sodium sulfate or sodium acetate.
2. The separation of heavy metal complexes from those salts which do not form complexes (treatment of effluents).
3. The purification of effluents which are obtained from the production and use of dyes and fluorescent brighteners.
4. The separation of proteins or hormones which have similar molecular weight but are of opposite charge.
5. The separation of ionic surfactants (detergents, wetting agents or dispersants) from other chemicals which are still present in the reaction mixture after the preparation of the surfactants (by-products, excess starting materials).
6. The removal of ionic surfactants from effluents.
7. The separation of ionic molecules (salts) from aqueous solution, i.e. the concentration of aqueous solutions which contain metal complexes, surfactants, dyes or proteins, the results obtained in this case being better, with regard to the efficiency (permeability (flux) per unit time) and the separating effect, than those obtained with known membranes.
8. The separation of compounds of opposite charge.
9. The separation of charged compounds from compounds with no charge.

The separation effect (the rejection) of the membranes can be measured as follows: a circular membrane with a surface area of 13 cm², resting on a sintered stainless steel disc, is used in a cylindrical cell made of stainless steel. 150 ml of the solution (to be tested), which contains the substance to be tested in the concentration $c_1$ (g of substance per g of solution), are introduced onto the membrane in the steel cylinder and, using nitrogen, subjected to pressure of 14 bars. The solution is stirred magnetically. The liquid which collects on the outlet side of the membrane is examined to determine its content (concentration) $c_2$ of the substance to be tested, 3 samples 5 ml each being taken from the start of the experiment. In general, the amount which flows through the membrane and the composition of the 3 samples are constant. The rejection can be calculated from the values obtained, using the equation.

$$R = \frac{c_1 - c_2}{c_1} \cdot 100\%$$

The amount of the material passed through the membrane per surface and time unit is found to be:

$$F = V \cdot S^{-1} \cdot t^{-1}$$

$V$: volume
$S$: membrane surface area
$t$: time

F is appropriately expressed in $m^3 \cdot m^{-2} \cdot d^{-1}$, i.e. the number of cubic meters per square meter surface area of the membrane and per day, or in $l \cdot m^{-2} h^{-1}$, i.e. liters per square meter surface area of the membrane per hour.

In addition to the measurements on flat membranes, measurements on tubular membranes 60 cm long and with an outer diameter of 1.4 cm are also carried out. For this purpose, these tubular membranes are placed in a perforated tube made of stainless steel.

The whole is placed in a tube made of polycarbonate. The outflow from the membrane is between this outer polycarbonate tube and the steel tube. The liquid is added as a stream of the solution in turbulent or laminar flow, under pressure. The flow rate is kept constant at 10-15 liters per minute. The rejection (R) and the flux (F) are calculated in the same way as for the flat membranes.

In the following examples, the dyes and colourless compounds of formulae (101) to (107) are used as reactive agents for crosslinking and charging the adsorbed polymer layer, while the dyes of formulae (108) to (110) are used in test solutions.

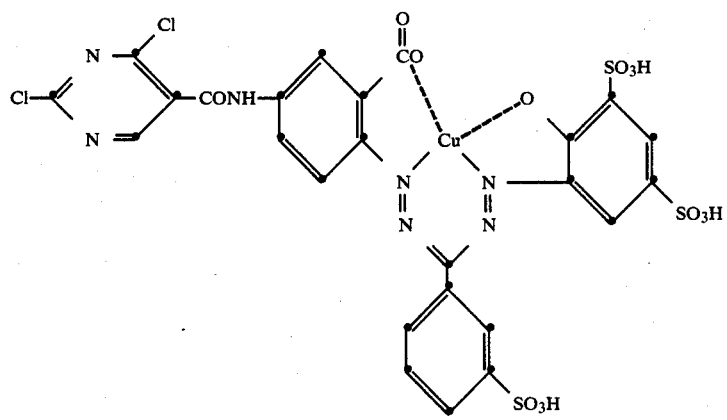

(101)

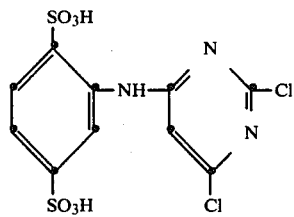
(102a)
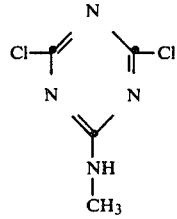
(102b)
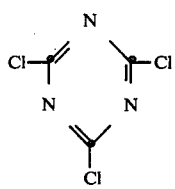
(102c)
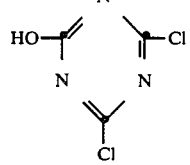
(102d)
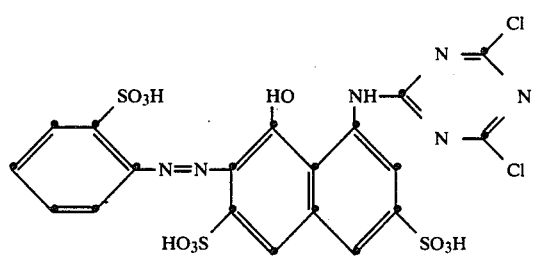
(103)
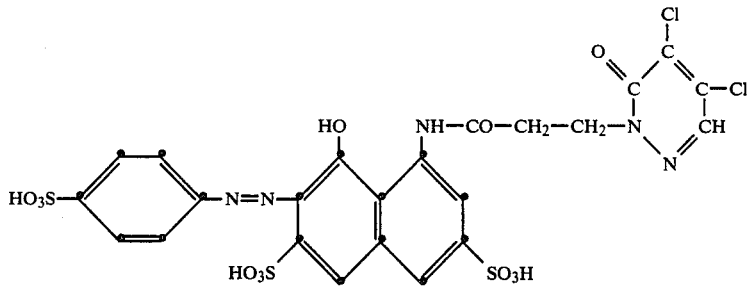
(104)
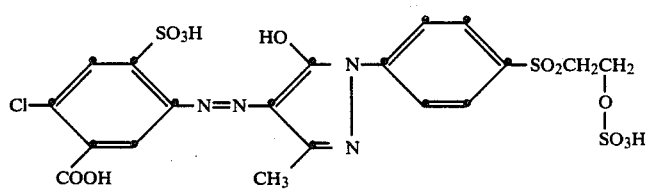
(105)
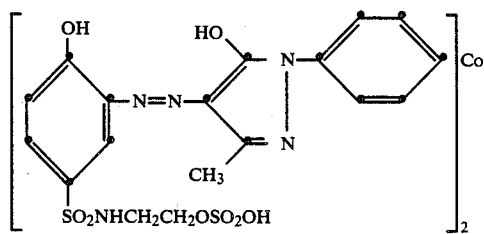
(106)
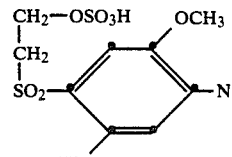
(107)

-continued

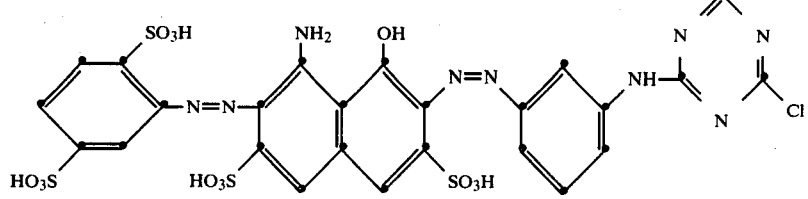
(108)

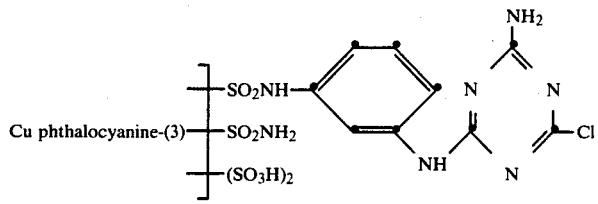
(109)

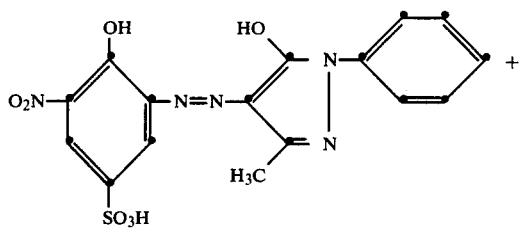
(110)

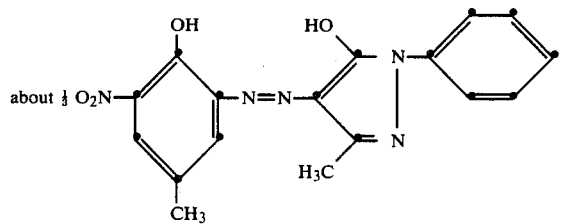

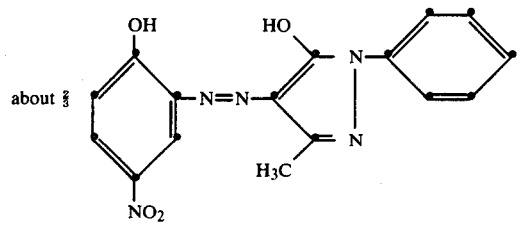

(1:2 chromium complex).

EXAMPLE 1

A polysulfone with repeating units of the formula

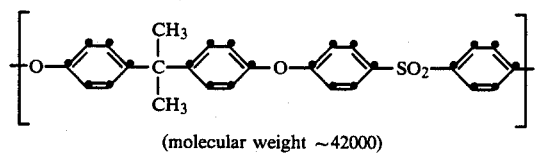

(molecular weight ~42000)

is chloromethylated: To a solution of 5 g polysulfone in 200 ml methylene chloride, 5 ml chloromethyl methyl-ether and 0.5 ml SnCl$_4$ are added, and the solution refluxed for 2 hours. After cooling the solution was poured into 500 ml methanol to precipitate the polymer. The polymer was further purified by redissolving in dimethyl formamide (DMF) and precipitating in water. The chloromethyl content is 1.7 meq/g. Likewise the chloromethylation can be carried out according to U.S. Pat. No. 3,984,399 by using paraformaldehyde, hydrochloric gas and zinc chloride.

An 18% solution of the chloromethylated polysulfone in N-methyl pyrrolidone is filtered, cast, 0.2 mm thick on a polyester non-woven and immersed immediately in an aqueous 0.5% sodium dodecyl sulfonate solution at 4° C. After leaching for 24 hours, the membrane is modified by immersion in a 10% aqueous solution of polyethylenimine (PEI). (M.W. 30,000–40,000) at 30° C. for 5 minutes, washing with tap water for 2 hours and then placed in a bath containing the reactive dye of formula (101) (1%), and sodium chloride (10%), for 15 minutes, drip drying for 10 seconds and immersion in a 2% Na$_2$CO$_3$ bath for 30 minutes at room temperature. The resultant membrane is insoluble in N-methylpyrrolidone and dimethyl formamide, indicating crosslinking. The flux and rejection of the membrane before and after modification is given in Table 1. A polysulfone membrane without chloromethylation has a flux and rejection to solute containing the dye of formula (109) of 130 l/m$^2$.hr and 76% respectively and is soluble in N-methylpyrrolidone (NMP).

Membranes of corresponding properties (flux, rejection) are obtained when using instead of polyethyleneimine a condensation product of dicyandiamide, ammonium chloride and formaldehde.

TABLE I

| Solute | Solute concentration % | Before Modification Rejection % | Before Modification Flux l/m$^2$·hr | After Modification Rejection % | After Modification Flux l/m$^2$·hr |
|---|---|---|---|---|---|
| Dye of formula (108) | 0.15 | 91 | 180 | 98.2 | 170 |
| Congo Red | 1.0 | 64 | 120 | 99.1 | 95 |
| Toluene Sulfonic acid | 1.0 | 16 | 180 | 47.6 | 112 |
| NaCl | 1.0 | 24 | 244 | 27 | 284 |

Testing conditions: pH-value 7.0; 25° C.; 10 bar.

EXAMPLE 2

This example illustrates (1) the affect of PEI of different molecular weights, and (2) a short reaction time of PEI with the chloromethylated product.

A 25% solution in NMP of a chloromethylated polysulfone prepared according in Example 1 with 1.6 meq Cl/g is prepared and a membrane formed on a support as in example 1. Different membrane pieces are then modified as in example 1 with the difference that the PEI of different molecular weights (100, 1200 and 30,000) and the time of reaction of the membrane with a given PEI is 3 minutes at room temperature instead of 5 minutes at 30° C. The results are given in Table 2.

TABLE II

| MW of PEI | Performance (Test Solute, Dye of formula (108), 15000 ppm + 1% NaCl) Flux L/m$^2$·D | Rejection % | NaCl Rejection % | Membrane Solubility in NMP |
|---|---|---|---|---|
| No modification | 1701 | 91.9 | −18.6 | Soluble |
| 600 | 1653 | 98.8 | −8.2 | Insoluble |
| 1200 | 1296 | 99.5 | −4.6 | Insoluble |
| 30,000 | 1029 | 99.9 | 0.15 | Insoluble |

EXAMPLE 3

Example 1 is repeated with the following change. A 14% instead of an 18% polymer solution is cast, and is immersed in water at room temperature instead of in a sodium dodecyl sulfonate solution at 4° C. The resultant membrane has a flux and rejection to 0.15% solute of the dye of formula (108) of 120 l/m$^2$.hr and 97% rejection respectively at 10 bar. Before modification the flux and rejection is 220 l/m$^2$.hr and 70% rejection.

EXAMPLE 4

Example 1 is repeated with a chloromethylated polymer with a chloromethyl content of 2.5 meq/g. The flux and rejection characteristics before and after modification are given in Table III.

EXAMPLE 5

Example 1 is repeated using a chloromethylated polymer with a chloromethyl content of 0.5 meq/g. The flux/rejection properties before and after modification are given in Table III.

EXAMPLE 6

Example 1 is repeated with a binary solvent/non-solvent casting solution of N-methylpyrrolidone/Acetone (4:1) at room temperature. The resultant membrane is then formed and modified as in Example 1 with the use of reactive agent of formula (102a) instead of dye of formula (101). The results are given in Tables III and IV.

EXAMPLE 7

Example 4 is repeated using tetraethylene pentamine (M.W. 189) instead of PEI (M.W. 30,000–40,000). The results are given in Table III.

EXAMPLE 8

Example 1 is repeated using a PEI of molecular weight 100,000 instead of 30,000–40,000. The results are given in Table III.

TABLE III

| Membrane Example | Solubility in N—methyl pyrrolidone after modification | Before Modification Rejection % | Before Modification Flux l/m$^2$·hr | After Modification Rejection % | After Modification Flux l/m$^2$·hr |
|---|---|---|---|---|---|
| 4 | insoluble | 83 | 140 | 99.0 | 160 |
| 5 | insoluble | 77 | 107 | 93 | 144 |
| 6 | insoluble | 93 | 200 | 99.3 | 70 |
| 7 | insoluble | 77 | 107 | 91 | 93 |
| 8 | insoluble | 91 | 180 | 99.6 | 85 |

Test conditions: pH-value 7.5; room temperature; 20 bar; dyestuff of formula (108) [0.15%].

TABLE IV

Solute Rejection and Water Flux of Modified membrane of Example 6.

| Test Solute | Conc. | Flux l/m$^2$·hr | Rejection % |
|---|---|---|---|
| Na$_2$SO$_4$ | 1% | 60 | 59 |
| Toluene Sulfonic Acid | 1% | 48 | 50 |
| NaCl | 1% | 65 | 14 |
| Dye of formula(108)[1] | 1.5% | 55 | 99.6 |
| Water |  | 80 | — |

Test conditions: pH-value 7.5; room temperature, 20 bar.
[1]After 100 hours of operation at pH 10, 55° C., the rejection was 99.3%.

(a) Additional stability test at pH 10, 60° C. showed the membranes flux and performance to be relatively stable for at least 4000 hrs as seen in the following table.

TABLE IVa

| Time of measurement (hrs) | 0 | 300 | 1000 | 2000 | 3000 | 4000 |
|---|---|---|---|---|---|---|
| Rejection (%) | 99.6 | 99.4 | 99.6 | 99.3 | 99.2 | 98.9 |

TABLE IVa-continued

| Flux (1/m². d) | 1421 | 1222 | 1300 | 1000 | 980 | 1340 |

(b) A tubular membrane is made by bob-casting a polymer solution described in Example 6 into a tubular non-woven support, gelled and modified as in Example 1.

The membrane has an initial rejection and flux to a 4% solution of dye of formula (108) at pH of 10, 50° C. at 20 bars of 98% and 1100 1/m².d, respectively. After 2000 bars of continuous operation at the same conditions with periodic cleaning the rejection and the flux are 98.2% and 1200 1/m².d.

EXAMPLE 9

Example 4 is repeated using polyvinylamine (M.W. 100,000) instead of PEI. The results are given in Table V.

EXAMPLE 10

Example 4 is repeated using polyvinylalcohol (M.W. 60,000) instead of PEI. The results are given in Table V.

EXAMPLE 11

Example 4 is repeated using a polymer (instead of PEI) prepared with a diallylamine salt described in Example 1 of GB Patent Application No. 2027614 and having repeating units of:

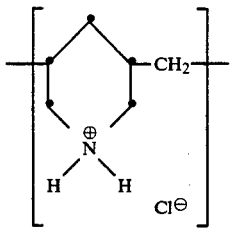

The results are given in Table V.

EXAMPLE 12

Example 4 is repeated using the butylenediamine derivative of polyepichlorohydrin (GB-PS No. 1,558,807) i.e.:

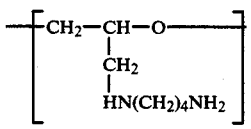

in place of PEI (M.W. 30,000–40,000). The results are given in Table V.

EXAMPLE 13

Example 4 is repeated using an amine containing polymer (instead of PEI) described in EP Application No. 0 008945 (Example 1)

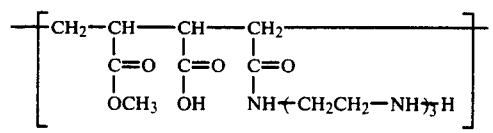

The results are given in Table V.

TABLE V
Substitution of Polyethylenimine with other Polymers

| Example | Rejection % | Flux 1/m² · hr |
|---|---|---|
| 9 | 98.6 | 130 |
| 10 | 92.0 | 96 |
| 11 | 94 | 87 |
| 12 | 97.0 | 102 |
| 13 | 96 | 118 |

Test conditions: pH-value 7.0; 25° C.; 20 bar; 0.15% of dye of formula (108).

EXAMPLE 14

Example 1 is repeated using the reactive multi-functional reagent of formula (102a) instead of reactive dye of formula (101). The reaction conditions are immersion in a solution containing 1% of the above reagent and 10% NaCl, for 30 minutes at 4° C., drip drying for 10 seconds, then immersion in 2% Na₂CO₃ bath for 15 minutes at room temperature and drying for 15 minutes at 50° C. The modified membrane has a flux and rejection to test solute containing the dye of formula (110) of 112 1/m².hr and 98% respectively under the test conditions of Example 1.

When using the multi-functional reagent of formula (102b) and leaving the other conditions unchanged a modified membrane is obtained showing a 99.6% rejection of dye of formula (108) (0.15% solution) at 20 bar.

EXAMPLE 15

Example 14 is repeated using the reactive dye of formula (103) instead of the reagent of formula (102a). The modified membrane has a flux and rejection to test solute containing the dye of formula (110) of 60 1/m².hr and 99.2%.

EXAMPLE 16

To a solution of 5 g chloromethylated polysulfone (1.77 meq/g) in 100 ml DMF 6 g of potassium phthalimide is added and stirred for 15 hours at 70° C. The suspension is filtered and the polymer is precipitated in methanol. The polymer is added to a solution of 10% hydrazine (95%) in ethanol and refluxed for 12 hours. The solid is filtered, washed with methanol and dried. The product (aminomethylated polysulfone) has an NH₂ capacity of 1.17 meq/g.

The amino methylated polysulfone is dissolved to make a 15% solution in dimethylformamide, filtered, cast 0.2 mm thick on a non-woven polyester support and immersed immediately in a water bath at 25° C. temperature. After leaching for 12 hours, the membrane is modified by immersion in a 2% cyanuric chloride water/acetone bath (4:1) at 0° C. for 1 hour, washed with ice water for 30 minutes, placed in a 10% solution of PEI (M.W. 30,000–40,000) for 30 minutes, washed with water for 1 hour and then reacted with the reactive dye of formula (101) as in Example 1. The flux and rejection to various solutes is given in Table VI.

TABLE VI

| Test solute | Conc. % | Before Modification Flux l/m²·hr | Rejection % | After Modification Flux l/m²·hr | Rejection % |
|---|---|---|---|---|---|
| dye of formula (108) | 0.15 | 220 | 70 | 80 | 98.5 |
| dye of formula (109) | 0.15 | 150 | 84 | 64 | 99.3 |
| NaCl | 1.0 | 142 | 9.0 | 82 | 16.0 |
| Na₂SO₄ | 1.0 | 120 | 41 | 75 | 76 |
| Toluene Sulfone Acid | 1.0 | 112 | 22 | 54 | 54 |

Test conditions: room temperature, 10 bar.

EXAMPLE 17

6 g chloromethylated polysulfone (1.0 meq/g) in 150 ml dioxane solution containing a 5 equivalent excess of diamino butane is stirred at 50° C. for 24 hours. The polymer is precipitated in 0.01N HCl, filtered and dried. The resultant polymer has 1.1 meq/g—NH₂ groups. A membrane is cast and formed as described in Example 1 and modified as in Example 16. The flux and rejection of the modified and unmodified membrane is given in Table VII.

EXAMPLE 18

To a solution of 6 g chloromethylated polysulfone in 100 ml dimethylformamide, 2 g NaCN are added and the mixture stirred overnight at 60° C. The orange solution is poured into water and the cyano methylated polysulfone precipitated filtered and dried in vacuum at 50° C. The cyano content is 0.8 meq/g.

A membrane is formed by the procedure described in Example 1. The membrane was then modified by the following sequence of chemical reactions:
(a) aqueous solution containing 10% NH₂OH and 7.5% Na₂CO₃, 55° C. for 5 minutes, washing 0.5 hours in water;
(b) aqueous solution containing 2% of cyanuric chloride, pH 9–10, 0° C., 15 minutes; washing with water 0° C., 10 minutes;
(c) aqueous solution containing 10% of polyethyleneimine (M.W. 30,000), pH 8.5 for 10 minutes; washing 2 hours with water then reacting with dye of formula (101) as in Example 1.

The flux/rejection characteristics before and after modification are given in Table VII.

EXAMPLE 19

To a solution of 0.5 g chloromethylated polysulfone (1.4 meq/g) in 100 ml dimethylformamide (DMF) 10 g of sodium acetate is added. The reaction mixture is stirred overnight at 60° C. After cooling the solution is poured into water and the resultant polymer is filtered and washed. The polymer is suspended in a 7% NaOH solution in 200 ml ethanol and 100 ml water and stirred overnight at 50° C. The solution is neutralized by adding a small amount of concentrated HCl and the polymer is filtered, washed and dried. The dried polymer has a hydroxy methyl content of 0.9 meq/g. The hydroxymethylated polysulfone is then modified as described in Example 16. The flux and rejection before and after modification are given in Table VII.

TABLE VII

| | Before Modification | | | | After Modification | | | |
|---|---|---|---|---|---|---|---|---|
| | 0.15% Dye Formula (108) | | 1% NaCl | | 0.15% Dye Formula (108) | | 1% NaCl | |
| Membrane | Rej. % | Flux l/m²·hr | Rej. % | Flux l/m²·hr | Rej. % | Flux l/m²·hr | Rej. % | Flux l/m²·hr |
| Example 16 | 50 | 186 | 5 | 220 | 97 | 115 | 20 | 140 |
| Example 17 | 35 | 74 | 14 | 85 | 88 | 84 | 25 | 80 |
| Example 18 | 62 | 86 | 20 | 122 | 92 | 34 | 36 | 78 |

Test conditions: pH-value 7.0; room temperature, 20 bar.

EXAMPLE 20

Example 6 is repeated using a 2% cyanuric chloride solution (water/acetone 4:1) at pH 9.0 and 0° C. for 15 minutes, followed by an additional 15 minutes at 50° C., instead of the reactive agent of formula (102a). The resultant membrane has a rejection to 1% solutions of sodium sulfate and sodium chloride of 51% and 19% respectively and a flux at 20 bar of 43 and 50 l/m².hr respectively.

EXAMPLE 21

A polysulfone with repeating units of the formula

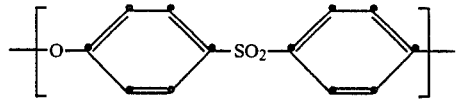

and a chloromethyl content of 1.0 meq/g is cast into a membrane and modified by the procedure described in Example 1. The modified membrane has a rejection and flux to test solute containing 0.15% of the dyestuff of formula (109), at 20 bar of 98.5% and 75 l/m².hr.

EXAMPLE 22

A polysulfone with repeating units of the formula

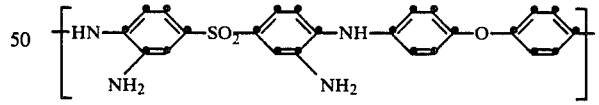

is prepared by the procedure described in Desalination, 21 (1977), pages 183–194.

A solution containing 15% of the above polymer and 30% LiNO₃ in N-methyl-pyrrolidone is cast on a glass plate, evaporated in an oven at 130° C. for 8 minutes, left to cool and immersed in ice water. After leaching for 12 hours, the membrane is modified by immersion in a 2% cyanuric chloride solution (water/acetone 4:1) for 10 minutes at 0° C., and a pH of 7.0, then rinsed in ice water for 10 minutes, immersed in a 10% aqueous solution of polyethyleneimine (M.W. 30,000–40,000) for 30 minutes at pH 8.5, and reacted with dye of formula (101) as in Example 1. The rejection and flux (20 bar, 25° C., test solute containing the dyestuff of formula (108) of the unmodified and modified membranes is 88.4% and 130 l/m².hr and 98% and 50 l/m².hr respectively. The modified membrane is crosslinking and insoluble in N-methyl-pyrrolidone.

EXAMPLE 23

Example 4 is repeated with the following changes: After the membrane is cast, it is modified by immersion into a 10% diamino butane solution for 4 hours at 50° C., washed, and then modified with cyanuric chloride, PEI and reactive dye as in Example 16. The resultant membrane has a rejection and flux to test solute containing 0.15% of the dye of formula (109) of 99% and 80 l/m².hr respectively at 20 bar.

EXAMPLE 24

A polysulfone with repeating units of the formula

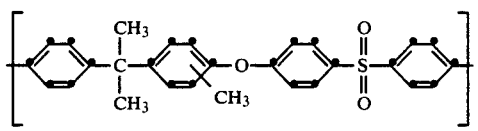

is brominated on the aromatic methyl radical with N-bromosuccinimide (NBS) by the following procedure: 10 g of polysulfone is dissolved in tetrachloroethane to which 12.0 g NBS and 0.5 g benzoyl peroxide are added and the solution is heated to 80° C. for 6 hours. The solution is precipitated in methanol, redissolved and repreciptaed. A 25% NMP solution of the bromomethylated polymer is filtered, cast and modified on a polyester non-woven as described in Example 1. The unmodified and modified membranes had rejection and flux to dye of formula (108) (1500 ppm at 20 bar) of 86% and 110 l/m².hr and 98%, 72 l/m².hr, respectively.

EXAMPLE 25

A polysulfone with repeating units of the formula

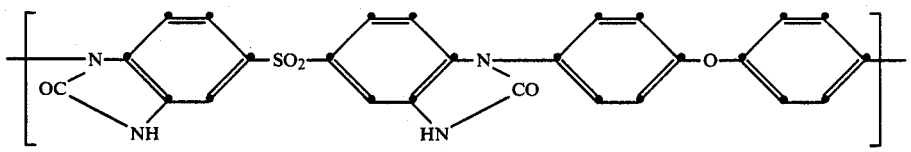

is synthesized by a procedure described in Desalination 21 (1977) pages 183–194. A 25% NMP solution is prepared, filtered, cast on a non-woven support and modified according to the procedure in Example 22. The modified membrane has a rejection of 99.2% to dye of formula (108).

EXAMPLE 26

A polysulfone with repeating units of the formula

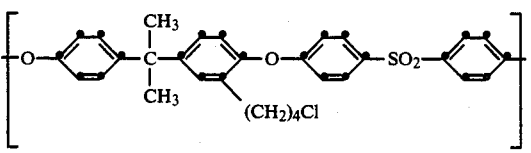

is prepared by the following procedure: To a stirred solution of 40 moles of non-alkylhalogenated polysulfone (P-1700 of Union Carbide Corp.) in 300 ml dry tetrahydrofuran (THF), a solution of 44 moles of n-BuLi is dropped at 0° C. under dry nitrogen atmosphere. After addition is complete the temperature is raised to room temperature and stirring is continued for a further two hours. Then the reaction mixture is cooled with an ice bath and a solution of 1-chloro-4-hydroxy butanol which is protected with dihydropyran in dry THF which is added dropwise. After addition is completed the stirring continues for 5 hours at 5° C. and then the reaction mixture is refluxed for 2 hours. In order to achieve the chloro alkylated polysulfone 50 ml of thionyl chloride is added in room temperature and the reaction mixture is refluxed for 1 hour. THF and excess of thionyl chloride are evaporated and the polymer is washed thoroughly with water. An n-chloro butyl substitution is obtained.

Reference: G. Schill and E. Logemann, Chem.Ber. pp 106–2919, (1973). H. W. Gschwerd and H. R. Rodriguez, Org. Reaction Vol. 26, p. 62.

A 25% solution of the polymer in NMP is prepared, cast and modified according to Example 1 and gives a final membrane with a 97.5% rejection to dye of formula (108) (1500 ppm) at 20 bar.

EXAMPLE 27

Example 6 is repeated with the exception that the water soluble derivative of cyanuric chloride of formula (102a) is used instead of cyanuric chloride in water without acetone. The resultant membrane has a rejection to dye of formula (108) (1500 ppm) of 98.2% at 20 bar. The benefit of using water soluble derivatives of the multifunctional reagents eliminates the need for organic solvents or surfactants to help solubilize or disperse the material and in may cases such as cyanuric chloride eliminates the need for working in well ventilated environments.

EXAMPLE 28

Membranes modified according to the procedure of Example 6 are placed at flat membranes in separation cells and operated with waste water containing a considerable amount of organic carbon at 50° to 55° C., at pH 10 and 20 bar for one hundred hours with periodic cleaning. The results are given in Table VIII.

TABLE VIII

| Time | Flux (l/m² · d) | Rejection (%) |
|---|---|---|
| 0 | 960 | 90 |
| 24 h | 720 | 85 |
| 50 h | 860 | 92 |
| 100 h | 900 | 85 |

The data show that up to 92% of the organic carbon can be separated from the waste water through the membrane treatment.

EXAMPLE 29

A polymer material of the following structure:

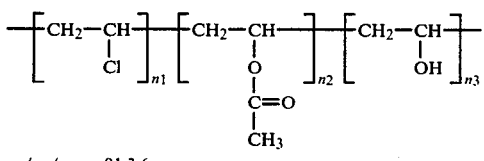

$n_1/n_2/n_3 = 91:3:6$ was cast into a membrane by the procedure described in Example 1 and modified according to the procedure described in Example 16. The rejection and flux of the unmodified and modified membrane (20 bar, 25° C., 0.15% solution of dyestuff of formula (108)) is 81% and 126 l/m².h and 98% and 80 l/m².h, respectively.

EXAMPLE 30

A condensate of bisphenolepichlorohydrin with repeating units of the formula

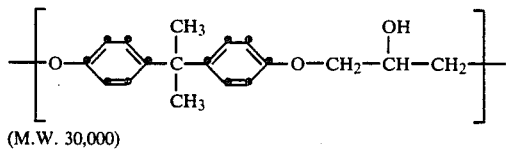

(M.W. 30,000)

is cast from a 15% solution of N-methylpyrrolidone by the procedure of Example 1 and modified by the methods given in Table IX.

The rejection and flux for the different stages of modification are given in the same Table.

TABLE IX
Modification of a Bisphenol-epichlorhydrin Membrane

| Modification | Flux l/m²·h | Rejection (%) |
|---|---|---|
| (1) None | 112 | 66 |
| (2) Cyanuric chloride, 30 min., pH 9-10 | 113 | 46 |
| (3) Cyanuric chloride, 30 min., pH 9-10; PEI (M.W. 30,000), 10 min., pH 8.5 | 60.2 | 75 |
| (4) As in (3) plus reactive agent of formula (101) via procedure described in Example 1. | 55 | 95 |

Test conditions: 1.5% solution of dyestuff of formula (108), 20 bar, 25° C.

EXAMPLE 31

A polybenzimidazole with repeating units of the formula

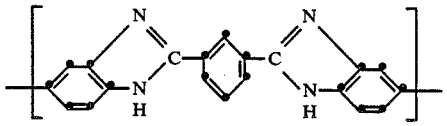

was synthesized according to the procedure described in Preparative Methods of Polymeric Chemistry, Sorenson W. R., and Campbell T. W., 2nd Edition, p. 169, Interscience Publishers. A 16% solution in dimethylacetamide is cast on a glass plate and immersed after an evaporation step of 15 minutes into a water dimethylacetamide (3:1) bath at 4° C. leaching and washing the membrane in tap water for 2 hours and modified according to Example 16. The rejection and flux to test solute containing 1.5% of dye of formula (110) is 96% and 40 l/m².h at 20 bar.

We claim:

1. A semipermeable membrane of a modified polysulfone which comprises repeating units of the formula $$\{M_1\text{---}R_1\text{---}M_2\text{---}R_2\text{---}SO_2\text{---}R_3\} \tag{1}$$

wherein $M_1$ and $M_2$ are independently a valence bond, —O— or —NH—, $R_1$ is a valence bond or a group of the formula

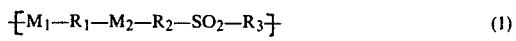

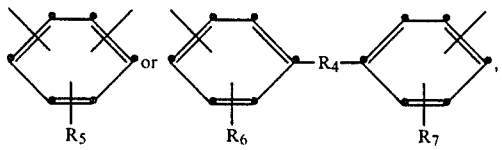

with the proviso that if $R_1$ is a valence bond, only one of $M_1$ and $M_2$ can be —O—, $R_2$ and $R_3$ are independently a group of the formula

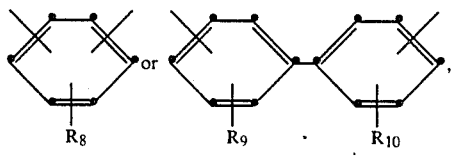

the aryl groups of $R_1$, $R_2$ and $R_3$ are optionally further substituted by alkyl of 1 to 4 carbon atoms, $R_4$ is a valence bond, —O—, alkylene of 1 to 4 carbon atoms optionally substituted or interrupted by cycloalkyl(ene) of aryl(ene) of at most 7 carbon atoms, or alkylidene of 2 to 4 carbon atoms, $R_5$ to $R_{10}$ are independently hydrogen, or —$R_{11}NH_2$,

or —$R_{13}OH$ radicals, these radicals being modified through a sequence of chemical reactions consisting essentially of steps (a) to (c), wherein:

step (a) is reacting said radicals with a monomeric compound containing at least two functional groups, to bond the —$R_{11}NH$—,

or —$R_{13}O$— of said radicals to one of the functional groups of the monomeric compound, step (b) is reacting a product of step (a) with a polyfunctional, linear or branched oligomer or polymer, to bond an available functional group of the monomeric compound to one of the functional groups of the oligomer or polymer and step (c) is reacting a product of step (b) with a nonionic or ionic compound containing at least one group capable of reaction with the product of step (b), to bond the non-ionic or ionic compound to the product of step (b), —$R_{12}X$ or —$R_{13}CHO$ radicals, modified through a sequence of chemical reactions consisting essentially of steps (b) and (c), or —$R_{13}CN$ radicals, modified through a sequence of chemical reactions consisting essentially of reacting said —$R_{13}$CN radicals with hydroxylamine to form an amidoxime group, followed by steps (a), (b) and (c), $R_{11}$ is a valence bond, —CH$_2$—, —(CH$_2$)$_p$NH(CH$_2$)$_{\overline{2-6}}$, —(CH$_2$)$_p$—O—(CH$_2$)$_{\overline{2-6}}$,

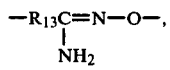

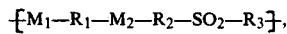

$R'_{11}$ constitutes atoms necessary to form an imidazolone ring condensed with a polymer backbone consisting of the repeating units of the formula (1), $R_{12}$ is —$C_nH_{\overline{2n}}$, $R_{13}$ is a valence bond or —$C_mH_{\overline{2m}}$, Y is —O—, —SO$_2$— or

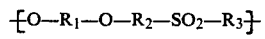

X is halogen, m is an integer of 1 to 5 and n is an integer of 1 to 6, p is zero or 1, wherein said membrane contains at least one radical selected from the group consisting of —$R_{11}$NH—,

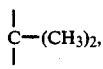

—$R_{12}$—, —$R_{13}$O—, —$R_{13}$CH= and

—$R_{13}$C=N—O—,
  |
  NH$_2$ a degree of substitution of substituents $R_5$ to $R_{10}$—different from hydrogen—being between 0.3 and 3.5 milliequivalents/g.

2. A membrane according to claim 1, wherein the modified polysulfone comprises repeating units of the formula $$\{M_1-R_1-M_2-R_2-SO_2-R_3\}, \quad (2)$$

wherein $M_1$ and $M_2$ are —O— or —NH— and $R_1$, $R_2$ and $R_3$ have the meanings indicated in claim 1.

3. A membrane according to claim 2, wherein the modified polysulfone comprises repeating units of the formula $$\{O-R_1-O-R_2-SO_2-R_3\} \quad (5)$$

wherein

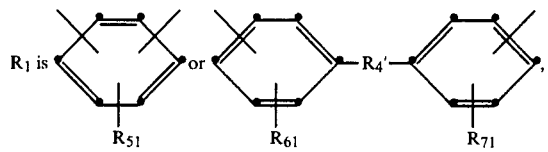

$R_2$ and $R_3$ are independently

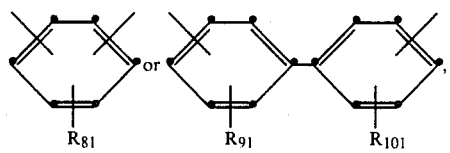

$R_4'$ is a valence bond or alkylene of 1 to 4 carbon atoms, $R_{51}$ to $R_{101}$ are independently hydrogen or —CH$_2$NH$_2$, —CH$_2$OH or —NH$_2$ radicals, modified through chemical reaction by steps (a), (b), and (c), —CH$_2$X radicals, wherein X is halogen, modified through chemical reaction by steps (b) and (c), or —CH$_2$CN radicals, modified through chemical reaction with hydroxylamine, and by steps (a), (b) and (c), the degree of substitution of substituents $R_{51}$ to $R_{101}$—different from hydrogen—being between 0.3 and 3.5 milliequivalents/g.

4. A membrane according to claim 3, wherein the polysulfone has repeating units of the formula

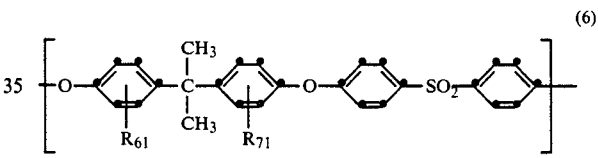

(6)

wherein $R_{61}$ and $R_{71}$ have the meaning indicated in claim 3 and the degree of substitution of substituents $R_{61}$ and $R_{71}$—different from hydrogen—being 0.3 to 3.5 meq/g.

5. A membrane according to claim 4, wherein $R_{61}$ and/or $R_{71}$ comprises —CH$_2$NH$_2$ groups, modified through a sequence of chemical reactions consisting essentially of (a), (b) and (c), wherein in step (a) said monomeric compound is an organic compound that contains reactive multiple bonds or epoxide, aziridine, aldehyde, imidate, isocyanate, isothiocyanate, hydroxyl, anhydride, acyl halide, carbonic acid imide halide or N-methylol groups, or is a compound containing substituents detachable as tertiary amines or as anions, or is a compound containing a combination of these groups and/or substituents, in step (b) said oligomer or polymer is a hydrophilic polyfunctional, aliphatic or aromatic oligomer or polymer containing amino, hydroxyl or thiol groups, and in step (c) said ionic compound contains at least one sulfonic acid group, or carboxylic group, optionally in the form of their salts, or ammonium group, —CH$_2$X groups, wherein X is halogen, modified through chemical reaction by steps (b) and (c), or —CH$_2$CN groups, modified through chemical reaction with hydroxylamine and by steps (a), (b) and (c).

6. A membrane according to claim 5, wherein said monomeric compound is a cyclic carbonic acid imide halide or a compound containing isocyanate, isothiocyanate or N-methylol groups.

7. A membrane according to claim 6, wherein said monomeric compound is a halogenodiazine or -triazine containing at least 2 reactive substituents and optionally ionic groups.

8. A membrane according to claim 7, wherein said monomeric compound is cyanuric chloride or tetrachloropyrimidine.

9. A membrane according to claim 5, wherein said oligomer or polymer comprises a member selected from the group consisting of polyethyleneimines, polyvinyl alcohols, cellulose derivatives, polyvinylamines, polyvinylanilines, polydialkylamines, amino modified polyepihalohydrines, condensation products of dicyandiamide, amine (ammonium) salts and formaldehyde, diamino condensation products of polyanhydrides, aminoalkyl polysulfones or aminoalkyl polyphenylene oxides.

10. A membrane according to claim 5, wherein said ionic compound is a colored compound.

11. A membrane according to claim 10, wherein said ionic compound is a reactive azo dye containing sulfonic acid groups, carboxyl groups and/or ammonium groups.

12. A membrane according to claim 11, wherein said ionic compound is a reactive azo dyestuff containing sulfonic acid (—SO$_3$H) or carboxyl (—COOH) groups and as reactive groups monochlorotriazinyl, dichlorotriazinyl, 2,4-dichloropyrimidinyl, vinyl sulfonyl, β-sulfatoethylsulfonyl, β-chloroethylsulfonyl or β-sulfatoethylaminosulfonyl radicals.

13. A membrane according to claim 5, wherein said ionic compound is a colorless compound containing halotriazinyl or halopyrimidyl radicals.

14. A membrane according to claim 5, wherein the compound (c) contains two groups capable of reacting with the product of step (b).

15. A membrane according to claim 1, wherein the modified polysulfone comprises repeating units of the formula

  (3)

wherein R$_2$ and R$_3$ have the meanings indicated in claim 1.

16. A membrane according to claim 1, wherein the modified polysulfone comprises repeating units of the formula

  (4)

wherein R$_1$, R$_2$ and R$_3$ have the meanings indicated in claim 1.

17. A membrane according to claim 1, wherein said non-ionic compound is a colorless non-ionic cyclic carbonic acid imide halide, a dihalide of dicarboxylic acids, a dialdehyde or a trihalide of tricarboxylic acids.

18. A membrane according to claim 1, wherein said modified polysulfone is supported as thin film by a porous support.

19. A membrane according to claim 1, wherein the non-ionic or ionic compound in step (c) contains two groups capable of reaction with the product of step (b).

20. A process for separating components dissolved in a solution which comprises disposing on one side of a semipermeable membrane according to claim 1 a solution with a solute, said solution having an osmotic pressure, and applying a hydraulic pressure against said solution and said membrane, said hydraulic pressure being greater than the osmotic pressure of said solution.

21. A process according to claim 20, which comprises separating monovalent ions of low ionic weight from polyvalent ions of low or relatively high ionic weight and monovalent ions of high ionic weight.

22. A process according to claim 21, wherein organic and metal-organic ionic substances are separated from by-product inorganic salts in a reaction mixture.

23. A process according to claim 22, wherein inorganic salts are separated from organic dyestuffs.

24. A process for purifying a solution with a solute which comprises disposing on one side of a semipermeable membrane according to claim 1 a solution with a solute, said solution having an osmotic pressure, and applying a hydraulic pressure against said solution and said membrane, said hydraulic pressure being greater than the osmotic pressure of said solution.

25. A process according to claim 24, wherein effluents obtained from dye production are purified by separating off dyes.

26. A process for concentrating a solution with a solute which comprises disposing on one side of a semipermeable membrane according to claim 1 a solution with a solute, said solution having an osmotic pressure, and applying a hydraulic pressure against said solution and said membrane, said hydraulic pressure being greater than the osmotic pressure of said solution.

* * * * *